United States Patent
Abe et al.

(10) Patent No.: US 7,997,563 B2
(45) Date of Patent: Aug. 16, 2011

(54) MICRO-BUBBLE GENERATOR, VORTEX BREAKDOWN NOZZLE FOR MICRO-BUBBLE GENERATOR, VANE SWIRLER FOR MICRO-BUBBLE GENERATOR, MICRO-BUBBLE GENERATING METHOD, AND MICRO-BUBBLE APPLYING DEVICE

(75) Inventors: Harumichi Abe, Ibaraki (JP); Kazuo Matsuuchi, Ibaraki (JP); Minoru Iidaka, Ibaraki (JP)

(73) Assignee: National University Corporation University of Tsukuba, Ibaraki (JP)

( * ) Notice: Subject to any disclaimer, the term of this patent is extended or adjusted under 35 U.S.C. 154(b) by 800 days.

(21) Appl. No.: 11/813,793

(22) PCT Filed: Nov. 17, 2005

(86) PCT No.: PCT/JP2005/021502
§ 371 (c)(1),
(2), (4) Date: Apr. 7, 2008

(87) PCT Pub. No.: WO2006/075452
PCT Pub. Date: Jul. 20, 2006

(65) Prior Publication Data
US 2008/0197516 A1 Aug. 21, 2008

(30) Foreign Application Priority Data

Jan. 13, 2005 (JP) ................. 2005-005813
May 17, 2005 (JP) ................. 2005-143682

(51) Int. Cl.
*B01F 3/04* (2006.01)
*B01F 5/02* (2006.01)

(52) U.S. Cl. ....................... 261/78.2; 261/79.2
(58) Field of Classification Search ............. 261/75, 261/78.2, 79.2, 83, DIG. 70; 210/628, 758, 210/150
See application file for complete search history.

(56) References Cited

U.S. PATENT DOCUMENTS

| | | | |
|---|---|---|---|
| 3,423,294 A * | 1/1969 | Sephton | 203/10 |
| 4,224,158 A * | 9/1980 | Molvar | 210/220 |
| 6,382,601 B1 | 5/2002 | Ohnari | |
| 7,059,591 B2 * | 6/2006 | Bortkevitch et al. | 261/76 |
| 7,261,283 B1 * | 8/2007 | Ohnari | 261/79.2 |

FOREIGN PATENT DOCUMENTS

JP 2000-249115 A 9/2000

(Continued)

OTHER PUBLICATIONS

PCT/JP2005/021502 International Search Report for corresponding PCT application dated Feb. 28, 2006.

(Continued)

*Primary Examiner* — Frank M Lawrence
(74) *Attorney, Agent, or Firm* — Matthew W. Witsil; Moore & Van Allen PLLC

(57) ABSTRACT

There is provided a micro-bubble generator including a swirling-flow generating vane nozzle and vortex breakdown nozzle connected coaxially to each other. The swirling flow generating vane nozzle produces a swirling flow of a liquid having a gas introduced to the center thereof from a gas feeding unit. The swirling flow is supplied to a flow constricting section included in the vortex breakdown nozzle to provide micro bubbles from a vortex breakdown section also included in the vortex breakdown nozzle.

17 Claims, 26 Drawing Sheets

FOREIGN PATENT DOCUMENTS

| | | |
|---|---|---|
| JP | 2002-143658 A | 5/2002 |
| JP | 2003-117368 A | 4/2003 |
| JP | 2003-126665 A | 5/2003 |
| JP | 2003-205228 A | 7/2003 |
| JP | 2003-275557 A | 9/2003 |
| JP | 2004-000878 A | 1/2004 |
| JP | 2004-024931 A | 1/2004 |
| JP | 2005-034814 A | 10/2005 |
| WO | 01-36105 A1 | 5/2001 |

OTHER PUBLICATIONS

PCT Notification of Transmittal of Copies of Translation of the International Preliminary Report on Patentability dated Jan. 24, 2008.

* cited by examiner

Fig. 18

| | | | |
|---|---|---|---|
| COMMON | NO. OF VANES | 6 | |
| | VANE INTERVAL | 60 deg. | |
| | VANE ANGLE | 15 deg. | |
| EXAMPLE 1 | NOZZLE LENGTH | 2.88cm | |
| | VANE LENGTH | 2.03cm | |
| | VANE WIDTH | 0.22cm | |
| | OUTSIDE RADIUS | 0.85cm | |
| | INSIDE RADIUS | 0.55cm | |
| | GROOVE DEPTH | 0.3cm | |
| | GROOVE WIDTH | 0.89cm | |
| | ARC ANGLE OF VANE | $67.4 \times \left( -0.0369 + \dfrac{0.780}{2.11 - (\text{POSITION})} \right)$ deg. | |
| | | POSITION = 0 | 0 deg. |
| | | POSITION = VANE LENGTH | 63.2 deg. |
| EXAMPLE 2 | NOZZLE LENGTH | 5.42cm | |
| | VANE LENGTH | 3.82cm | |
| | VANE WIDTH | 0.42cm | |
| | OUTSIDE RADIUS | 1.6cm | |
| | INSIDE RADIUS | 1.1cm | |
| | GROOVE DEPTH | 0.5cm | |
| | GROOVE WIDTH | 1.68cm | |
| | ARC ANGLE OF VANE | $35.8 \times \left( -0.0695 + \dfrac{0.276}{3.98 - (\text{POSITION})} \right)$ deg. | |
| | | POSITION = 0 | 0 deg. |
| | | POSITION = VANE LENGTH | 59.3 deg. |
| EXAMPLE 3 | NOZZLE LENGTH | 7.10cm | |
| | VANE LENGTH | 5.00cm | |
| | VANE WIDTH | 0.55cm | |
| | OUTSIDE RADIUS | 2.1cm | |
| | INSIDE RADIUS | 1.6cm | |
| | GROOVE DEPTH | 0.5cm | |
| | GROOVE WIDTH | 2.20cm | |
| | ARC ANGLE OF VANE | $27.3 \times \left( -0.0912 + \dfrac{0.476}{5.22 - (\text{POSITION})} \right)$ deg. | |
| | | POSITION = 0 | -3.3 deg. |
| | | POSITION = VANE LENGTH | 56.6 deg. |

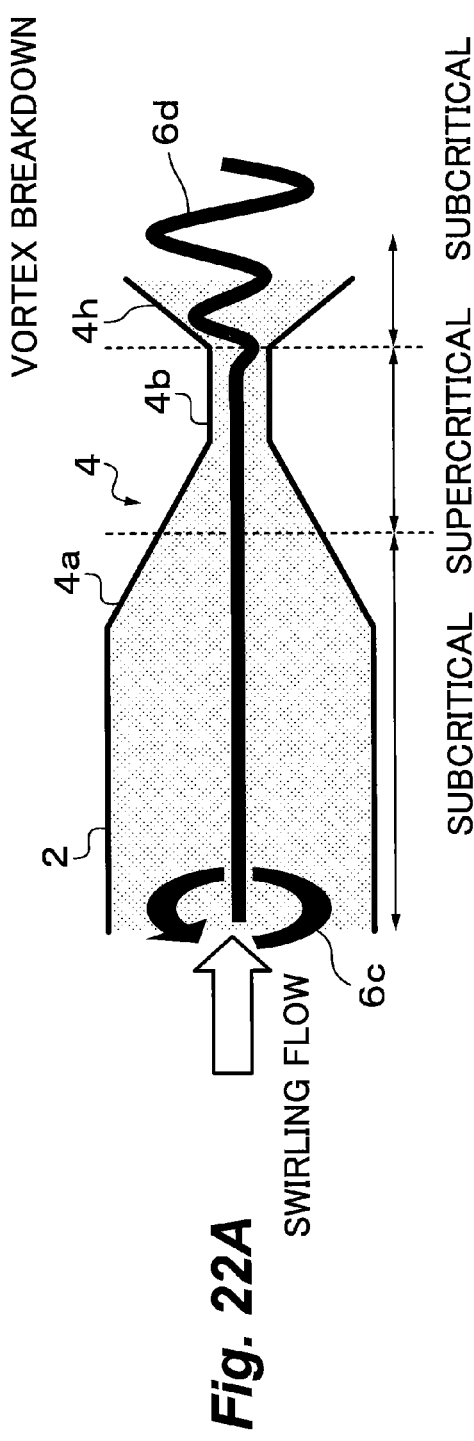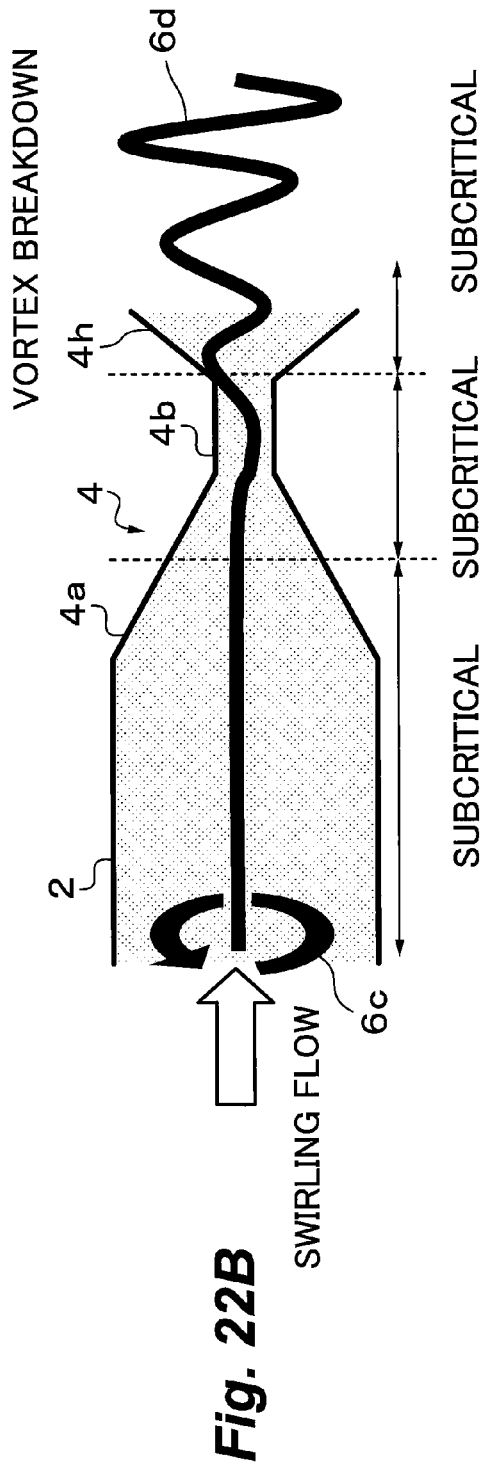

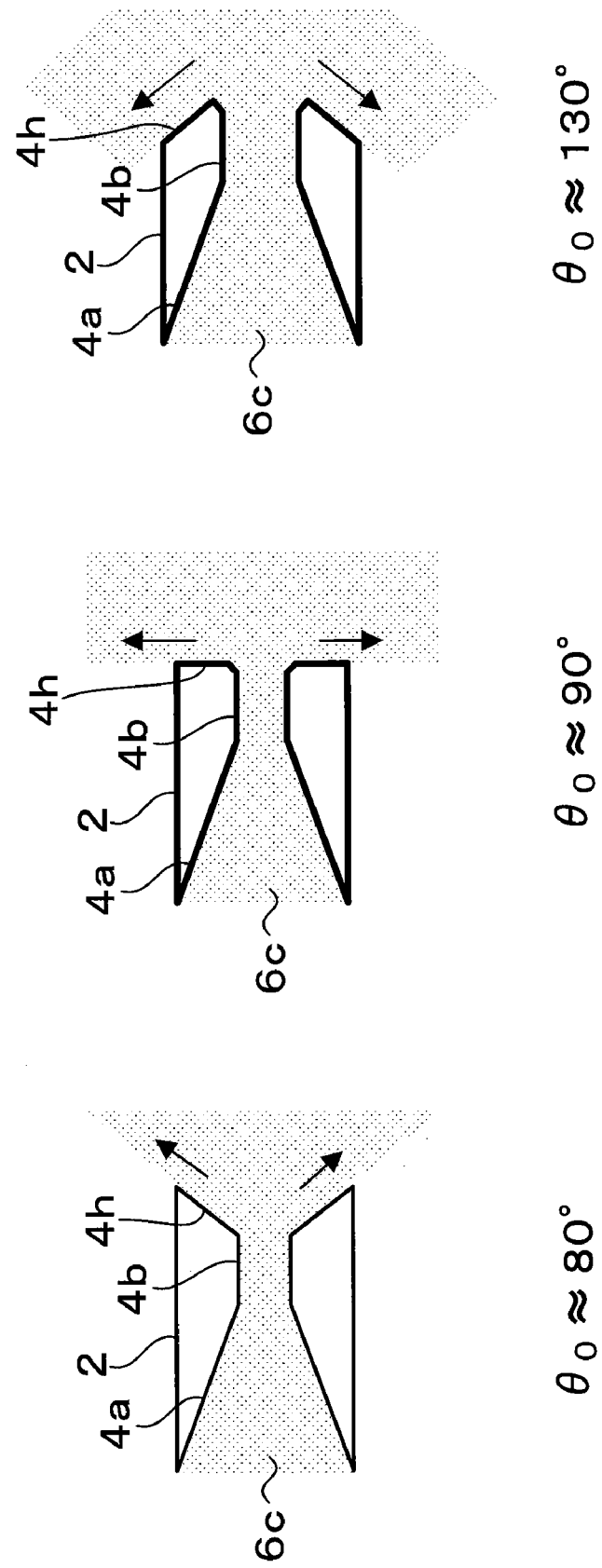

MICRO-BUBBLE GENERATOR, VORTEX BREAKDOWN NOZZLE FOR MICRO-BUBBLE GENERATOR, VANE SWIRLER FOR MICRO-BUBBLE GENERATOR, MICRO-BUBBLE GENERATING METHOD, AND MICRO-BUBBLE APPLYING DEVICE

CROSS REFERENCE TO RELATED APPLICATION

The present application claims priority benefits under 35 U.S.C. §371 to International Patent Application No. PCT/JP2005/021502, entitled "Micro-Bubble Generator, Vortex Breakdown Nozzle for Micro-Bubble Generator, Vane Swirler for Micro-Bubble Generator, Micro-Bubble Generating Method, and Micro-Bubble Applying Device," filed Nov. 17, 2005, and claims priority to Japanese Patent Application No. 005813/2005, filed Jan. 13, 2005, and Japanese Patent Application No. 143682/2005, filed May 17, 2005, the entire contents of all of which are incorporated by reference in their entirety.

TECHNICAL FIELD

The present invention relates to a micro-bubble generator, vortex breakdown nozzle for the micro-bubble generator, vane swirler for the micro-bubble generator, micro-bubble generating method and a micro-bubble applying device, which are suitably applied in, for example, water purification with micro bubbles.

BACKGROUND ART

The micro bubbles have a diameter of 10 to several ten μm when just produced. That is, the micro bubbles are very small in comparison to air bubbles normally developed in water. Such air bubbles are about a few millimeters in diameter. Being so extremely small, the micro bubbles will adsorb fine contaminants and make them rise to the water surface. Thus, the micro bubbles are used in marine-product washing, water purification, etc.

As a typical micro-bubble generator, a swirling type micro-bubble generator is disclosed in the brochure of the International Publication No. 00/69550. The swirling type micro-bubble generator includes a container having a bottomed cylindrical internal space, a pressurized liquid inlet formed open in a part of the container wall tangentially of the cylindrical-space circumference, a gas inlet formed open in the bottom of the cylindrical space and a swirling gas-liquid mixture outlet formed open in the top of the cylindrical space.

Also, the Japanese Published Unexampled Patent Application No. 2003-205228 discloses a swirling type micro-bubble generator including a cone-shaped container having a conical internal space, a pressurized liquid inlet formed open in a part of the container wall tangentially of the cylindrical-space circumference, a gas inlet formed open in the bottom of the cylindrical space and a swirling gas-liquid mixture outlet formed open in the top of the cylindrical space.

Further, a swirling type micro-bubble generator is disclosed in the Japanese Published Unexampled Patent Application No. 2000-447. The micro-bubble generator includes a structure to swirl a liquid flow under pressure into a circular chamber, a structure to form a swirl-up flow at the periphery of a gradually divergent covered cylinder provided above the liquid flow introducing structure, a structure formed inside the periphery of the cylinder to form a swirl-down flow, a swirling cavity formed at the middle of the swirl-down flow generating structure to have a negative pressure under centrifugal/centripetal separation, a structure formed in the negative-pressure swirling cavity to form a down-swirling gas vortex tube by expanding and taping the flow, and a structure in which the gas vortex tube rushing into and out of a central back-flow hole is forcibly discontinued to generate micro bubbles.

However, the above conventional micro-bubble generator cannot easily be designed small or large and connected directly to an existing apparatus using the micro bubbles since the components thereof are not disposed linearly. The size of air bubbles generated depends upon the amount of the gas introduced into the liquid but cannot accurately set since the feed rate has to be adjusted intuitively.

Accordingly, it is desirable to overcome the above-mentioned drawbacks of the related art by providing a micro-bubble generator that can be designed small or large for direct connection to an existing equipment using micro bubbles, a vortex breakdown nozzle and vane swirler, suitable for use with the micro-bubble generator, a micro-bubble generating method and a micro bubbles-applied apparatus using the micro-bubble generator.

The foregoing and other problems in the related art will become apparent from the following description.

DISCLOSURE OF THE INVENTION

To overcome the above-mentioned drawbacks of the related art, the Inventors of the present invention have been contributed to make researches on the micro-bubble generators as will be outlined below:

The Inventors of the present invention had made experimental and theoretical studies and found that utilization of the vortex breakdown to generate micro bubbles was most effective for overcoming the drawbacks, and developed a micro-bubble generator based on the vortex breakdown. In this micro-bubble generator, a field of flow velocity where a high-speed swirling flow becomes unstable is generated to give birth to a field of vortex breakdown, and air bubbles are introduced into the vortex-breakdown field to break down the air bubbles into micro bubbles.

For development of this micro-bubble generator, it was necessary to solve various technical problems such as generation of micro bubbles with control of air-bubble diameter, generation of micro bubbles without dependence upon which a nozzle used is, large or small, generation of micro bubbles in various environmental conditions (e.g., water depth, water quality, etc.) and the like. The Inventors found that use of a vortex breakdown nozzle including a flow constricting section and vortex breakdown section, use of vanes for producing a swirling flow, automatic adjustment of the rate at which a gas is fed to the swirling flow, based on the result of pressure detection at the vortex breakdown nozzle, etc., which will be described in detail later, were effective for solution of the above technical problems, and finally worked out the present invention.

According to a first embodiment of the present invention, there is provided a micro-bubble generator including at least a vortex breakdown nozzle including a flow constricting section and vortex breakdown section, wherein a swirling liquid flow having a gas introduced to the center thereof is supplied to the flow constricting section to provide micro bubbles from the vortex breakdown section.

The "vortex breakdown" referred to herein means a phenomenon that a vortex undergoes sudden structural changes. There have been known two outstanding types of vortex breakdown, spiral (vortex breakdown will take place when delta vanes are used) and bubble (vortex breakdown will take place in a flow in a cylindrical container).

Typically, the flow constricting section of the vortex breakdown nozzle is gradually decreased in sectional area toward the vortex breakdown section (or tapers toward the vortex breakdown section) to be equal in sectional shape to the vortex breakdown section at the boundary (or the connection) between these sections. The vortex breakdown section has a shape selected as necessary. More specifically, the vortex breakdown section is cylindrical, is gradually increased in sectional area toward the outlet of the nozzle or has such a shape that an angle $\theta_0$ formed between a first portion thereof which is cylindrical and second portion which is wider toward the outlet is 0 deg.$<\theta_0<$180 deg. In case the vortex breakdown section has thus the cylindrical first portion and second portion being wider toward the outlet, the inner circumferential surface of the first portion and end face of the second portion should desirably be joined smoothly to each other so that the swirling flow can be formed for adherence to the end face of the second portion which is also the micro bubble blow-out side of the vortex breakdown nozzle.

The liquid flow may basically be swirled in any one of well-known manners. However, it should preferably be swirled with the use of a swirling-flow generating vane type nozzle coupled coaxially to the vortex breakdown nozzle. In this case, the swirling flow is produced by supplying the liquid to the inlet of the swirling-flow generating vane type nozzle. Typically, the swirling-flow generating vane type nozzle includes a vane swirler accommodated in a cylindrical pipe, for example (or the outer surfaces of such vane swirler are enclosed in a pipe). Typically, the vane swirler includes a cylindrical body of which one end portion is formed streamlined (typically like a body of revolution (hemispheric, for example) taking the center axis of the cylindrical body as the axis of revolution) and a plurality of vanes provided on the outer surface of the cylindrical body longitudinally of the latter to have their rear portions curved. A gas jet orifice is formed in the other end face thereof. Typically, the vane swirler has a gas inlet formed in the outer surface of the cylindrical body and the gas jet orifice formed at the other end of the cylindrical body, and the gas inlet and jet orifice communicate with each other via a channel formed in the cylindrical body. The pipe accommodating the vane swirler may be formed uniform in diameter. However, for a higher efficiency of conversion, by the swirling-flow generating vane type nozzle, of a liquid supplied from one end of the pipe into a swirling flow as well as for reduction of energy loss of the liquid by lessening the influence of the flow constricted by the swirling-flow generating vane type nozzle, the pipe should preferably include a first section and a second section thicker than the first section and in which the vane swirler is accommodated.

Typically, the micro-bubble generator further includes a gas feeding unit that feeds a gas to a gas inlet of the swirling fluid generating vane assembly. Preferably, the gas feeding unit should have a breather controllable in sectional area, and be designed so that the rate at which the gas fed to the gas inlet of the swirling-flow generating vane nozzle is adjusted by controlling the sectional area of the breather. Typically, the breather of the gas feeding unit and gas inlet of the vane swirler are connected to each other by a gas supply tube via which the gas is fed from the breather of the gas feeding unit to the gas inlet of the vane swirler. Typically, the sectional area of the breather is controlled based on a result of detection of a pressure in the vortex breakdown section or on the combination of this result of detection and a result of detection of a pressure outside the vortex breakdown section. It is thus possible to feed the gas to the swirling flow automatically.

Also, the gas feeding to the swirling flow may be done automatically by adjusting the rate at which the gas is fed to the gas inlet of the swirling-flow generating vane nozzle correspondingly to a result of detection of a unique vortex whistle caused due to vortex breakdown in the vortex breakdown section.

Basically, the liquid in which the micro bubbles are to be generated may be of any kind. More specifically, it may be, for example, any one of water, water having a thickener such as cellulose added thereto, various kinds of environmental water (lake water, river water, polluted water, etc.), various kinds of sludge such as construction sludge, various kinds of organic solvents (alcohol, acetone, toluene, etc.), liquid fuel such as petroleum, gasoline, etc.

Basically, the gas fed to the center of the swirling flow may be of any kind. More specifically, it may be, for example, any one of air, oxygen, ozone, hydrogen, argon, etc.

A typical embodiment of the micro-bubble generator includes a vane swirler having a body of which the front cylindrical portion is formed hemispheric, a plurality of vanes provided on the outer surface of the body longitudinally of the latter and of which the rear portions being curved and a jet orifice formed in the rear face of the body; a tubular pipe enclosing the vane swirler and having disposed therein at the front end thereof a vortex breakdown nozzle including a tapered flow constricting section and a tubular vortex breakdown section joined to the flow constricting section and in which the liquid flows; and a gas feeding unit that detects a pressure difference in the vortex breakdown nozzle and feeds the liquid flow, at a controlled feed rate, to the vane nozzle formed from the vane swirler (may be called "turbine vane type nozzle" since the vane swirler resembles in profile a turbine vane) enclosed in the pipe. In this micro-bubble generator, the vane type nozzle directs the liquid flow circumferentially while blowing out a gas column and the vortex breakdown nozzle constricts a liquid-gas mixture thus produced to break down the vortex.

Also, according to a second embodiment of the present invention, there is provided a micro-bubble generating vortex breakdown nozzle for use in a micro-bubble generator, the nozzle including a flow constricting section and a vortex breakdown section.

Also, according to a third invention of the present invention, there is provided a vane swirler for use in a micro-bubble generator, the vane assembly including a cylindrical body of which one end is formed streamlined, a plurality of vanes provided on the outer surface of the body longitudinally of the latter to have their rear portions curved, and a gas jet orifice formed in the other rear end of the body.

Also, according to a fourth embodiment of the present invention, there is provided a micro-bubble generating method in which at least a vortex breakdown nozzle including a flow constricting section and a vortex breakdown section is used to provide micro bubbles from the vortex breakdown section by supplying the flow constricting section with a swirling flow of a liquid having a gas introduced to the center thereof.

Also, according to a fifth embodiment of the present invention, there is provided a micro-bubble applying device including at least a micro-bubble generator in which at least a vortex breakdown nozzle including a flow constricting section and a vortex breakdown section is used to provide micro bubbles from the vortex breakdown section by supplying the flow constricting section with a swirling flow of a liquid having a gas introduced to the center thereof.

The micro-bubble applying device may basically be of any type as long as it is to make a variety of liquid processing by generating micro bubbles in a liquid. More specifically, it is, for example, a water purifier, cleaning equipment, etc.

The illustration and description made above of the first invention of the present invention will apply to the above second to fifth inventions unless the latter are contrary in nature to the first invention.

The present invention has the advantages as will be described below. According to the present invention, micro bubbles can easily be generated just by supplying the vortex breakdown nozzle with a swirling liquid flow produced by the swirling-flow generating vane nozzle etc. and having a gas introduced to the center thereof. The components of the micro-bubble generator, such as the vortex breakdown nozzle, swirling-flow generating vane nozzle, etc. may be disposed linearly so that the micro-bubble generator can easily be designed small or large for easy direct connection of the micro-bubbler generator to an existing apparatus using the micro bubbles. For example, the micro-bubble generator thus designed small can easily be assembled in a part of an apparatus. Also, the large micro-bubble generator designed large will advantageously be employable in a large-scale project such as purification of an expanse of water, for example.

Further, since the gas is introduced to the center of the swirling liquid flow correspondingly to the result of detection of a pressure in the vortex breakdown section of the vortex breakdown nozzle, the gas feeding can be automated to correctly set any desired size of the micro bubbles, not intuitively.

Also, since the groove depth and blow-out angle of the swirling-flow generating vane nozzle can be adjusted correspondingly to the performance of a pump used for supply of a liquid, the micro-bubble generator can easily be designed optimally.

Micro bubbles are helpful for the nature-symbiosis technology adopted in the water purification, recycling of construction sludge, etc. Having a unique physico-chemical quality, the micro bubbles are utilizable in various fields of industry and very important for the industries. Porosity contributes to weight reduction of a material, and the micro bubbles are effectively utilizable to produce porous materials. More specifically, the area of contact between a gas and liquid can be increased by injecting the gas in the form of microbubbles into the liquid, and also the time of contact between the gas and liquid can be increased by delaying floating of the micro bubbles to increase solution of the gas into the liquid. Suspended solids in the liquid can effectively be removed owing to the effect of adsorption/condensation and flotation of the micro bubbles. The peeling effect of the micro bubbles and energy developed at breakdown of the micro bubbles can effectively be used in cleaning. Also, the micro bubbles are effectively usable for development of new techniques in the field of earthwork, such as prevention of the liquefaction of sand-layer ground etc.

The micro bubbles generated by the above micro-bubble generator and micro bubbles-applied apparatus can effectively be used in various fields of industry such as various types of purification of an expanse of water (water purification of lakes, rivers, reservoirs, etc.), tideland regeneration, cultivation of oysters and scallops, reduction of resistance to marine vessels, descaling of lead pipes, ultrasonic washing, fields of agriculture, forestry and fisheries, fields of medicine, field of sanitation, etc.

BRIEF DESCRIPTION OF THE DRAWINGS

FIG. 18 is a table for explanation of geometric data on examples of the turbine vane type nozzle of the micro-bubble generator as the first embodiment of the present invention.

FIGS. 22A and 22B schematically illustrate two types of vortex breakdown, respectively, in the micro-bubble generator as the second embodiment of the present invention.

FIGS. 31A, 31B and 31C are axial-sectional views showing shapes of the vortex breakdown nozzle used in the micro-bubble generator as the seventh embodiment of the present invention.

BEST MODE FOR CARRYING OUT THE INVENTION

Embodiments of present invention will be described in detail below with reference to the accompanying drawings.

First, there will be explained the micro-bubble generator as the first embodiment of the present invention.

To generate microbubbles, this micro-bubble generator has disposed serially therein a turbine vane type nozzle that forms a strong swirling flow from a liquid such as water flowing through a pipe by closing a central portion of the pipe to increase the circumferential flow velocity of the liquid, and a vortex breakdown nozzle that changes, into a small flow, a flow of the liquid superior in circulation to the main flow. Also, to adjust the diameter of each micro bubble, a pressure difference in the vortex breakdown nozzle is detected to automatically adjust the rate at which a gas is fed into the swirling flow so that the vortex breakdown will take place stably in the vortex breakdown nozzle.

Figure 1:
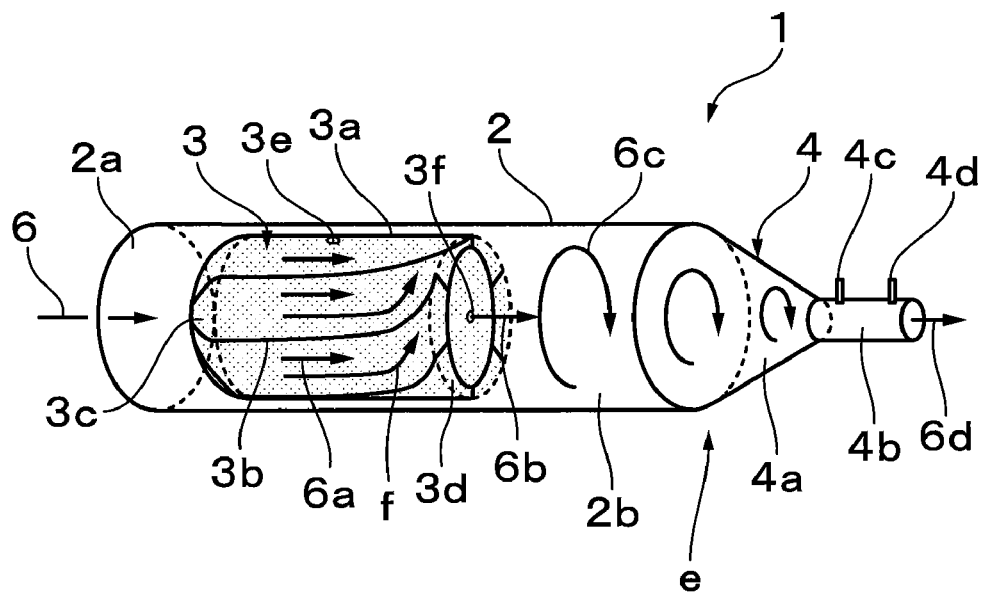
FIG. 1 is a perspective view of the body of a micro-bubble generator as a first embodiment of the present invention.
Figure 2:
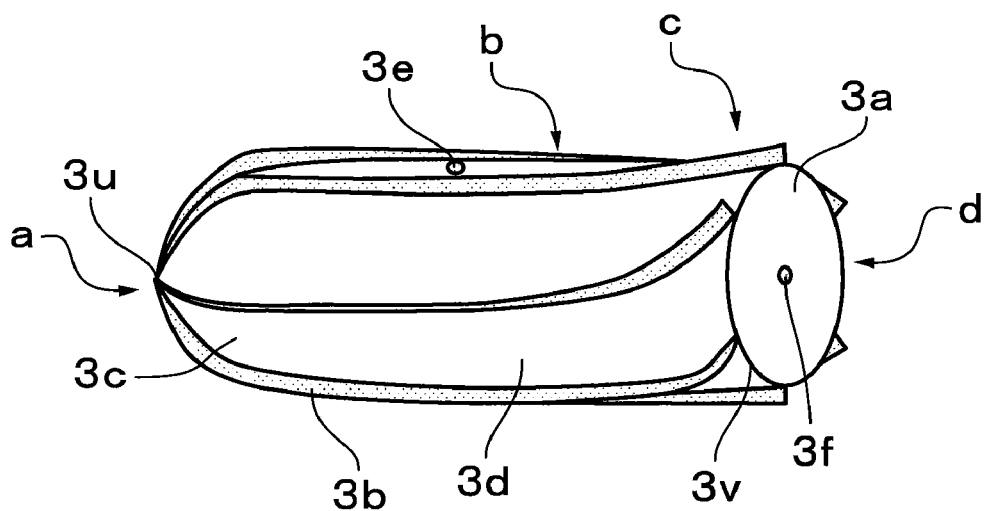
FIG. 2 is a perspective view of vanes of a turbine vane type nozzle used in the micro-bubble generator as the first embodiment of the present invention.
Figure 3:
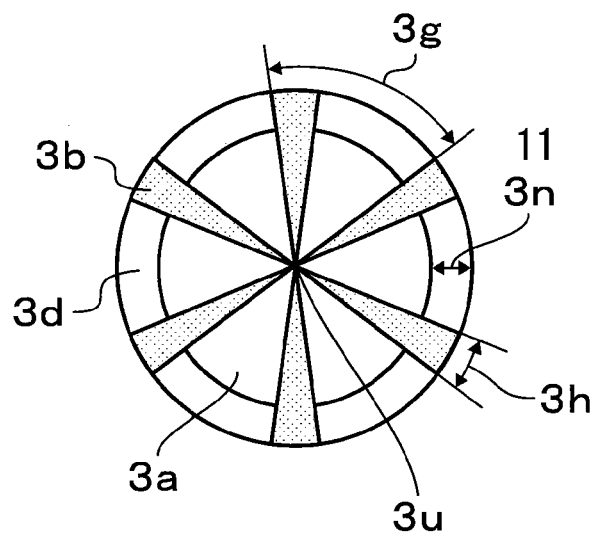
FIG. 3 is a front view of the vanes of the turbine vane type nozzle of the micro-bubble generator as the first embodiment of the present invention.
Figure 4:
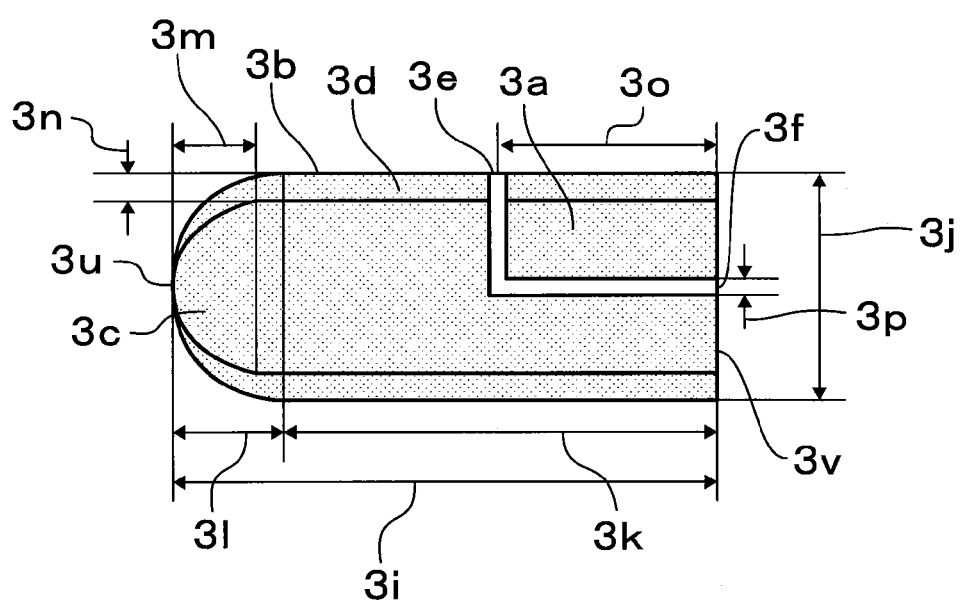
FIG. 4 is an axial-sectional view of the vanes of the turbine vane type nozzle of the micro-bubble generator as the first embodiment of the present invention.
Figure 5:
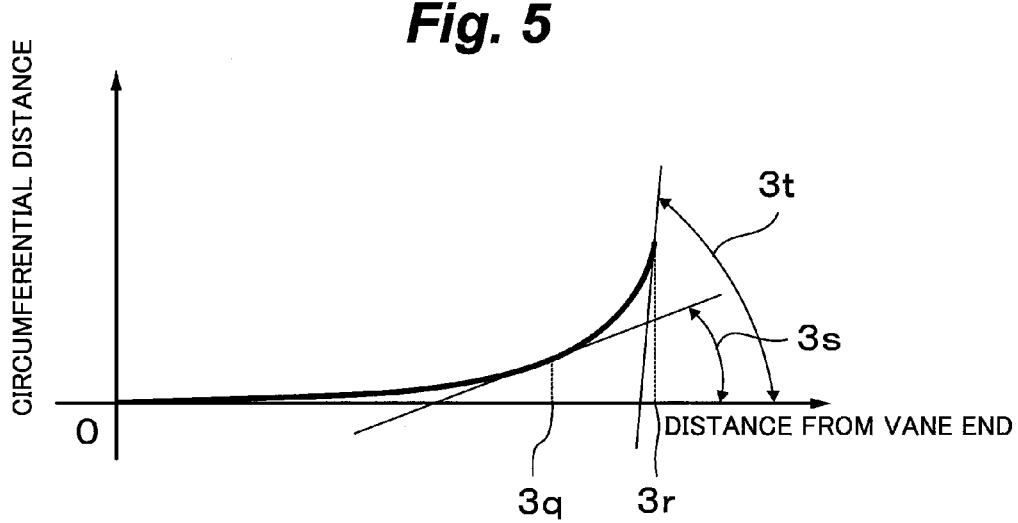
FIG. 5 schematically illustrates the shape of one of the vanes of the turbine vane type nozzle of the micro-bubble generator as the first embodiment of the present invention.
Figure 6:
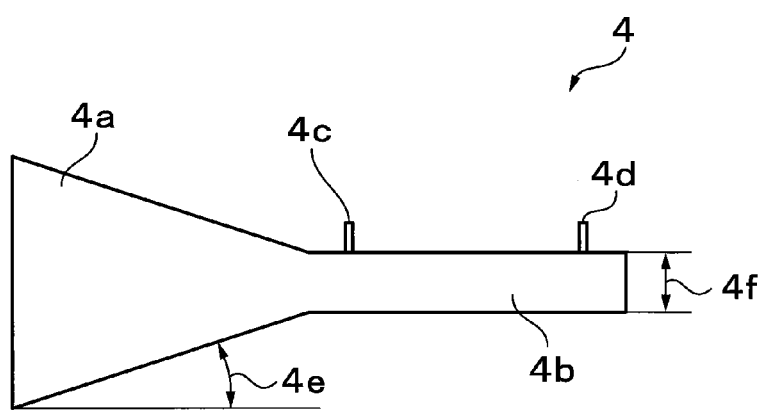
FIG. 6 is an axial-sectional view of a vortex breakdown nozzle of the micro-bubble generator as the first embodiment of the present invention.
Figure 7:
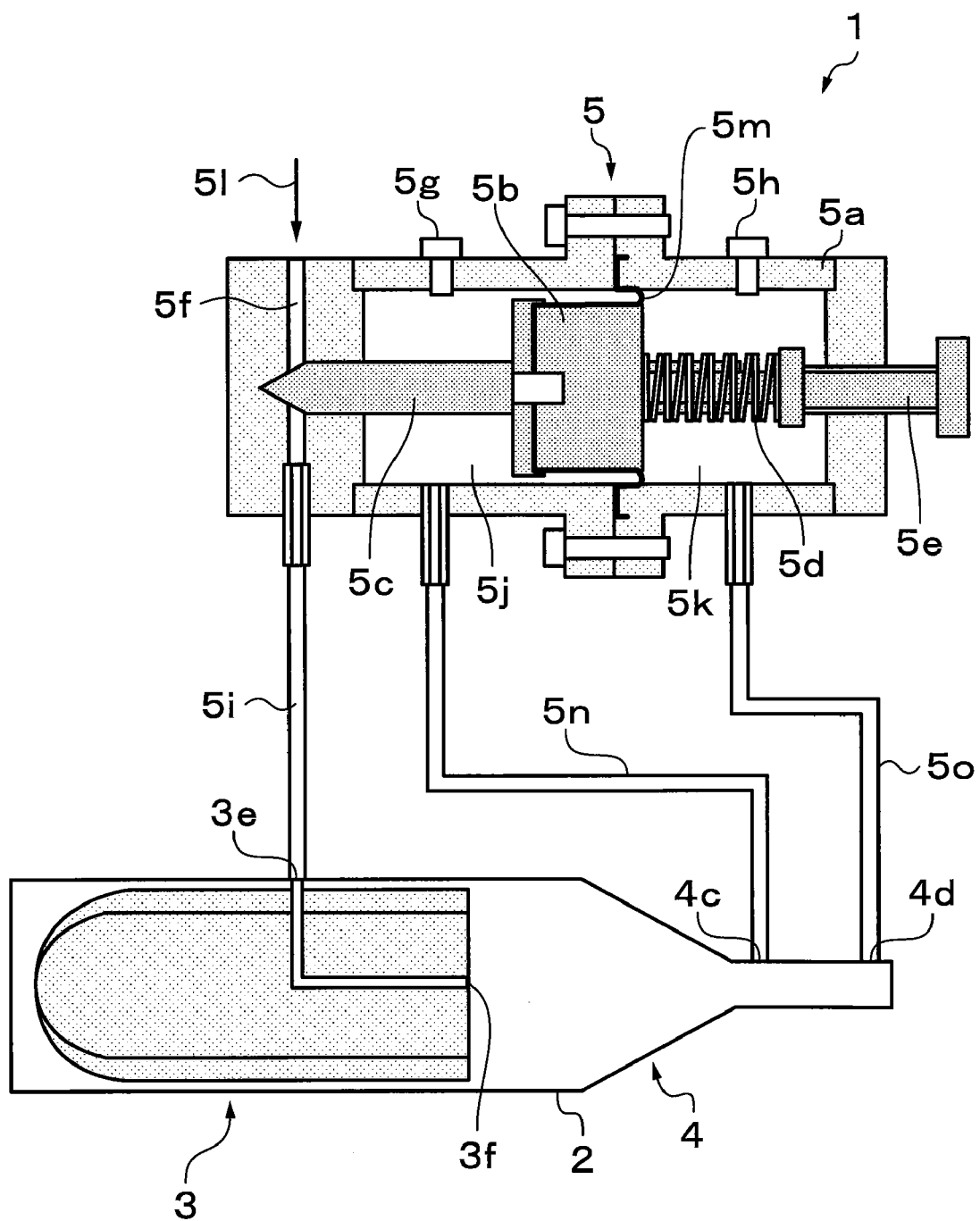
FIG. 7 is an axial-sectional view of a gas feeding unit of the micro-bubble generator as the first embodiment of the present invention.

FIG. 1 shows a main unit of the micro-bubble generator, FIG. 2 to 4 show the turbine vane type nozzle in the micro-bubble generator, FIG. 5 is a development elevation of one of the vanes of the turbine vane type nozzle, FIG. 6 shows the vortex breakdown nozzle of the micro-bubble generator, and FIG. 7 shows a gas feeding unit, connected to the main unit, of the micro-bubble generator.

As shown in FIGS. 1 to 7, the micro-bubble generator 1 includes a cylindrical pipe 2 having disposed therein a turbine vane type nozzle 3 and vortex breakdown nozzle 4, and the gas feeding unit 5. The turbine vane type nozzle 3 includes a cylindrical body 3a. The cylindrical body 3a has a front portion a formed hemispheric, a plurality of vanes 3b fixed longitudinally to the outer surface b thereof and of which the rear portions c are curved, and a rear end face d having a jet orifice 3f formed therein. The body 3a with the vanes 3b is enclosed in the pipe 2 with the outer edges of the vanes being opposite to the inner surface of the pipe 2. The vortex breakdown nozzle 4 is disposed at an end portion e of the pipe 2. The vortex breakdown nozzle 4 includes a tapered flow constricting section 4a and a tubular vortex breakdown section 4b joined to the flow constricting section 4a. As best shown in FIG. 7, the gas feeding unit 5 detects a pressure difference in the vortex breakdown section 4b of the vortex breakdown nozzle 4 and adjusts the rate at which a gas 5l is fed to the turbine vane type nozzle 3. In the pipe 2, a liquid 6 flows through an inlet 2a, turbine vane type nozzle 3, swirling section 2b and vortex breakdown nozzle 4 in this order. The pipe 2 can be designed in various sizes for connection to existing equipment that uses micro bubbles.

In the micro-bubble generator 1, the liquid 6 such as water in which micro bubbles are going to be generated is supplied to the inlet 2a of the pipe 2, the turbine vane type nozzle 3 jets a gas column 6b while having the flow of liquid 6 such as water flow go in the circumferential direction f, and the vortex breakdown nozzle 4 constricts the flow for vortex breakdown. More specifically, the liquid 6 supplied to the inlet 2a of the pipe 2 will become a liquid flow 6a having the velocity increased because the central portion of the pipe 2 is occupied by the turbine vane type nozzle 3. The liquid flow 6a flows along grooves 3d defined on the outer surface b of the turbine vane type nozzle 3 and is directed circumferentially (in the circumferential direction f) of the turbine vane type nozzle 3 to form a swirling flow 6c which will go on through the swirling section 2b. In the swirling section 2b, the gas column 6b released from the jet orifice 3f of the turbine vane type nozzle 3 will be spirally swirled along with the swirling flow 6c. In the vortex breakdown nozzle 4, the swirling flow 6c will be constricted to flow at a higher velocity than the circulation velocity, thus resulting in vortex breakdown. The vortex breakdown will break large air bubbles into finer ones, namely, micro bubbles 6d. The micro bubbles 6d are released from an outlet of the vortex breakdown nozzle 4. On the assumption that the circulation is kept in the flow constricting section 4a and the rotational frequency of the swirling flow 6c in the swirling section 2b is f, inside diameter of the pipe 2 is D and inside diameter of the vortex breakdown section 4b is $D_e$, the rotational frequency $f_e$ of the swirling flow 6c at the minimum section of the vortex breakdown nozzle 4, that is, at the section of the vortex breakdown section 4b, will be $f_e = (D/D_e)^2 f$.

The turbine vane type nozzle 3 is provided to change the liquid flow 6a such as water flow into the spiral swirling flow 6c while releasing the gas column 6b. The plurality of vanes 3b is fixed to the outer surface b of the body 3a and enclosed in the pipe 2. The turbine vane type nozzle 3 may not be rotated and thus needs no motive energy. It should be noted that the gas column 6b refers herein to air bubbles resulted from jetting of a gas 5l such as air in the form of a column.

The body 3a is cylindrical (having a rectangular section), of which the front portion a is joined to the hemispheric portion 3c (having a semicircular section). It has the jet orifice 3f formed at the center of the rear face d.

The vanes 3b are disposed to extend longitudinally on the outer surface b of the body 3a from the top 3u of the hemispheric portion 3c to the rear end 3v of the hemispheric portion 3c, and they are curved as they go toward the rear end 3v in order to direct the liquid flow 6a circumferentially (in the circumferential direction f) of the body 3a. The vanes 3b at the hemispheric portion 3c are also formed generally hemispheric. However, the vanes 3b at the hemispheric portion 3c may be omitted as appropriate. Since the vanes 3b project from the body 3a, there is defined a groove 3d between adjacent ones of the vanes 3b.

The hemispheric portion 3c is rounded to help the liquid 6 having entered from the inlet 2a of the pipe 2 in flowing smoothly into the groove 3d. The pipe 2 is required to form a flow having a large angular momentum from the jet flow released from the turbine vane type nozzle 3 and going in the circumferential direction f.

The grooves 3*d* are defined between the adjacent vanes 3*b* and the liquid 6 thus flows through the grooves 3*d*. Since the vanes 3*b* are curved as mentioned above, the liquid flow 6*a* having flowed horizontally (center-axially of the pipe 2) is gradually turned vertically to provide the spiral swirling flow 6*a* which will go out of the turbine vane type nozzle 3.

The jet orifice 3*f* is provided to release the gas column 6*b* from which the micro bubbles are to be formed. The gas column 6*b* is formed by feeding the gas 5*l* from a gas inlet 3*e* formed in the outer surface b of the body 3*a*. The gas column 6*b* released from the jet orifice 3*f* will flow on along with the swirling flow 6*c*.

The vanes 3*b* should be equal in shape to each other and disposed equidistantly in order to divide the liquid 6 into equal flows. The vanes 3*b* are disposed at intervals 3*g*. In this example, the vanes 3*b* count six in number and the inter-vane interval 3*g* is 60 deg., to which however the present invention is not limited.

The vane angle 3*h* determines the size of the vane 3*b* extending along the hemispheric portion 3*c*. The vane 3*b* extends at a constant angle from the center until it reaches the body 3*a*. Then, it extends maintaining the same width. It should be noted that if the vane angle 3*h* is larger, the groove 3*d* between the adjacent vanes 3*b* through which the liquid 6 flows is narrower. So, the vane angle 3*h* should preferably be on the order of 15 deg. to which however the present invention is not limited.

The groove 3*d* as the route of the liquid 6 has a depth 3*n* which is also the depth of the groove 3*d* and height of the vane 3*b*. It should be noted that the groove depth 3*n* may be adjusted appropriately depending upon the size of the turbine vane type nozzle 3.

The nozzle length 3*i* indicates the total length of the turbine vane type nozzle 3. It is equal to the sum of a vane length 3*k* which is the length of the body 3*a* and an outside radius 3*l* of the hemispheric portion 3*c*. It should be noted that the appropriate size of the turbine vane type nozzle 3 varies depending upon the size of the pipe 2.

The nozzle diameter 3*j* indicates the diameter of the turbine vane type nozzle 3. The nozzle diameter 3*j* is the sum of the diameter of the body 3*a* and height of the vane 3*b*. It is also the diameter of the hemispheric portion 3*c* joined to the body 3*a*.

Since the rear portion c of the vane 3*b* is curved as shown, the actual length of the vane 3*b* itself is larger than the vane length 3*k*. It should be noted that the length of a portion of the vane 3*b* corresponding to the hemispheric portion 3*c* is not included in the vane length 3*k*.

The outside radius 3*l* includes the height of the vane 3*b* at the hemispheric portion 3*c*. It is also the length of a perpendicular line extending from the top 3*u* of the hemispheric portion 3*c* to the body 3*a*. It should be noted that since there is the groove 3*d* between the adjacent vanes 3*b*, the outside radius 3*l* stands on the assumption that the grooves 3*d* are buried.

The inside radius 3*m* indicates the radius of the hemispheric portion 3*c*. The inside radius 3*m* is a radius of a portion, joined to the body 3*a*, of the hemispheric portion 3*c* and does not include the vane 3*b*. Since the hemispheric portion 3*c* is formed spherical starting at a position the groove depth 3*n*, which is a difference from the outside diameter 3*l*, off the body 3*a* toward the front end 3*u*, the top (front end) 3*u* of a hemisphere having the inside radius 3*m* coincides with the top (front end) 3*u* of a hemisphere having the outside radius 3*l*.

The inter-hole distance 3*o* indicates the distance from a rear end face 3*v* of the turbine vane type nozzle 3 where the jet orifice 3*f* is formed to the gas inlet 3*e*. The inter-hole distance 3*o* should preferably be a half of the vane length 3*k*, to which however the present invention is not limited. Also, the gas inlet 3*e* should preferably be formed in the vane 3*b* through which the liquid 6 will not pass, to which however the present invention is not limited.

The gas inlet 3*e* and jet orifice 3*f* communicate with each other inside the turbine vane type nozzle 3 so that the gas 5*l* supplied from the gas inlet 3*e* provided on the outer surface b of the turbine vane type nozzle 3 will be released from the jet orifice 3*f* formed at the center of the rear end face d of the turbine vane type nozzle 3.

The channel inside diameter 3*p* indicates the inside diameter of a channel connecting the gas inlet 3*e* and jet orifice 3*f* to each other. This channel inside diameter 3*p* will have an influence on the flow rate of the gas column 6*b* released from the jet orifice 3*f* and should thus be adjusted to an appropriate value. A channel inside diameter 3*p* is determined correspondingly to the feed rate of the gas 5*l*. The channel inside diameter 3*p* should preferably be on the order of 2 mm, for example, to which however the present invention is not limited.

FIG. 5 is a development elevation of one of the vane 3*b* of the turbine vane type nozzle 3, graphically illustrating how the vane 3*b* is curved. The horizontal axis of this graph indicates a distance from the vane end (front end) in the flowing direction, and vertical axis indicates a circumferential distance. A curve plotted by the vane 3*b* exists within a range from 0 to the vane length 3*k*. It should be noted that the distance 3*q* indicates a distance taking an arbitrary value when the distance from the vane end is between 0 and vane length 3*k* and the distance 3*r* indicates a distance taking a value when the distance from the vane end is the vane length 3*k*.

The gradient 3*s* indicates a gradient at the distance 3*q*. When the distance 3*q* is 0, the gradient 3*s* is 0 deg. As the distance 3*q* increases, the gradient 3*s* is correspondingly larger. The vane 3*b* is given the gradient 3*s* because the liquid flow 6*a* should go along the flow when the distance 3*q* is 0 and the liquid flow 6*a* should be let to go in the circumferential direction f in the case of the distance 3*r*. The gradient 3*s* permits to change the liquid flow 6*a* into the swirling flow 6*c*. However, for the vane 3*b* to be able to make the flow in the circumferential direction f larger than that in the main-flow direction so that vortex breakdown will take place in the vortex downstream section 4*b* of the vortex breakdown nozzle 4, the gradient 3*t* at the rear end of the vane 3*b* should be larger than about 55 to 60 deg. More specifically, the vane 3*b* should preferably form an angle of 5 to 9 deg. and more preferably of 5 to 6 deg. with the circumferential direction f of the body 3*a*, for example. That is, the gradient 3*t* over the distance 3*r* should preferably be 81 to 85 deg., and more preferably 84 to 85 deg., to which however the present invention is not limited.

The vortex breakdown nozzle 4 is to generate micro bubbles 6*d* by the vortex breakdown of the gas column 6*b* having flowed along with the swirling flow 6*c* through the swirling section 2*b* of the pipe 2. It is joined integrally to the end of the pipe 2. The vortex breakdown nozzle 4 includes the flow constricting section 4*a* and vortex breakdown section 4*b*. The flow constricting section 4*a* is a tapered pipe. It is joined at the large-diameter end thereof to the swirling section 2*b* of the pipe 2 and at the small-diameter end to the vortex breakdown section 4*b*. The angle (taper angle) 4*e* at which the flow constricting section 4*a* is tapered depends upon the size of the pipe 2 and the like. An appropriate cone angle 4e is selected as necessary. The cone angle 4e is about 20 deg. for example, to which however the present invention is not limited. The vortex breakdown section 4b is cylindrical and smaller in diameter than the swirling section 2b of the pipe 2. It is joined at one end thereof to the small-diameter end of the flow constricting section 4a, and the other end is the outlet of the vortex breakdown nozzle 4. The inside diameter 4f of the vortex breakdown section 4b also depends upon the size of the pipe 2 and the like. An appropriate inside diameter 4f is selected as necessary. The inside diameter 4f is 0.5 to 1.5 cm, for example, to which however the present invention is not limited.

The liquid 6 having flowed through the pipe 2 will flow from the swirling section 2b of the pipe 2 into the flow constricting section 4a at the large-diameter end. Since the flow constricting section 4a is tapered, the liquid 6 will flow at a higher velocity to the vortex breakdown section 4b. The gas column 6b having flowed along with the liquid 6 is broken down in the vortex breakdown section 4b and released as the micro bubbles 6d from the outlet of the vortex breakdown nozzle 4.

A minimum diameter of the vortex breakdown nozzle 4, with which vortex breakdown will take place, that is, a critical nozzle diameter, is determined as will be described below:

In brief, the rotational frequency f of the swirling flow 6c produced by the vanes 3b of the turbine vane type nozzle 3 is determined as in Cassidy et al. (J. Fluid Mech., Vol. 41, pp. 727-736, 1970). Since the rotational frequency f and rotational frequency $f_e$ of the swirling flow 6c at the minimum section of the vortex breakdown section 4a have, between them, a relation $f_e=(D/D_e)^2 f$, the rotational frequency $f_e$ is given by the following expression:

$$f_e = \frac{Q}{R^3}\left(\frac{\alpha_0}{8\varepsilon^2} + \alpha_1 \frac{3 - 3\delta + \delta^2}{6\pi\kappa\varepsilon^2\delta(2-\delta)^2}\tan\theta_f\right). \quad (1)$$

where R is D/2 (outside radius 3l as shown in FIG. 4), Q is a rate at which the liquid 6 is fed to the pipe 2, ρ is a density of the liquid 6, $\varepsilon=r_e/R$ (where $r_e=D_e/2$), $\delta=h/R$ (where h is equal to the groove depth 3n as shown in FIG. 4), $\kappa=N_v\Delta\theta/2\pi$ (where $N_v$ is the numbers of vanes 3b and Δθ (rad.) is an angle of the groove 3d (groove angle)), $\theta_f$ is equal to the gradient 3t as shown in FIG. 5, and $\alpha_0$ and $\alpha_1$ are constants ($\alpha_0$=0.4 and $\alpha_1$=1).

The number of times of circulation $\Gamma_e$ in the flow constricting section 4a of the vortex breakdown nozzle 4 is given by the following expression:

$$\Gamma_e \equiv \frac{r_e^2 \omega_e}{r_e u_e} = \frac{r_e \cdot 2\pi f_e}{u_e}, u_e \equiv \frac{Q}{\pi r_e^2} \quad (2)$$

where $u_e$ is a flow velocity at the outlet of the vortex breakdown nozzle 4 and $\omega_e$ is a rotational frequency of the swirling flow 6c at the section of the vortex breakdown section 4b. By substituting $f_e$ in the expression (1) in the expression (2), the number of times of circulation $\Gamma_e$ is determined to be as given below (as in Cassidy et al., J. Fluid Mech., Vol. 41, pp. 727-736, 1970):

$$\Gamma_e = \alpha_0 \frac{\pi^2}{4}\varepsilon + \alpha_1 \frac{\pi\varepsilon(3-3\delta+\delta^2)}{3\kappa\delta(2-\delta)^2}\tan\theta_f \quad (3)$$

Figure 8:
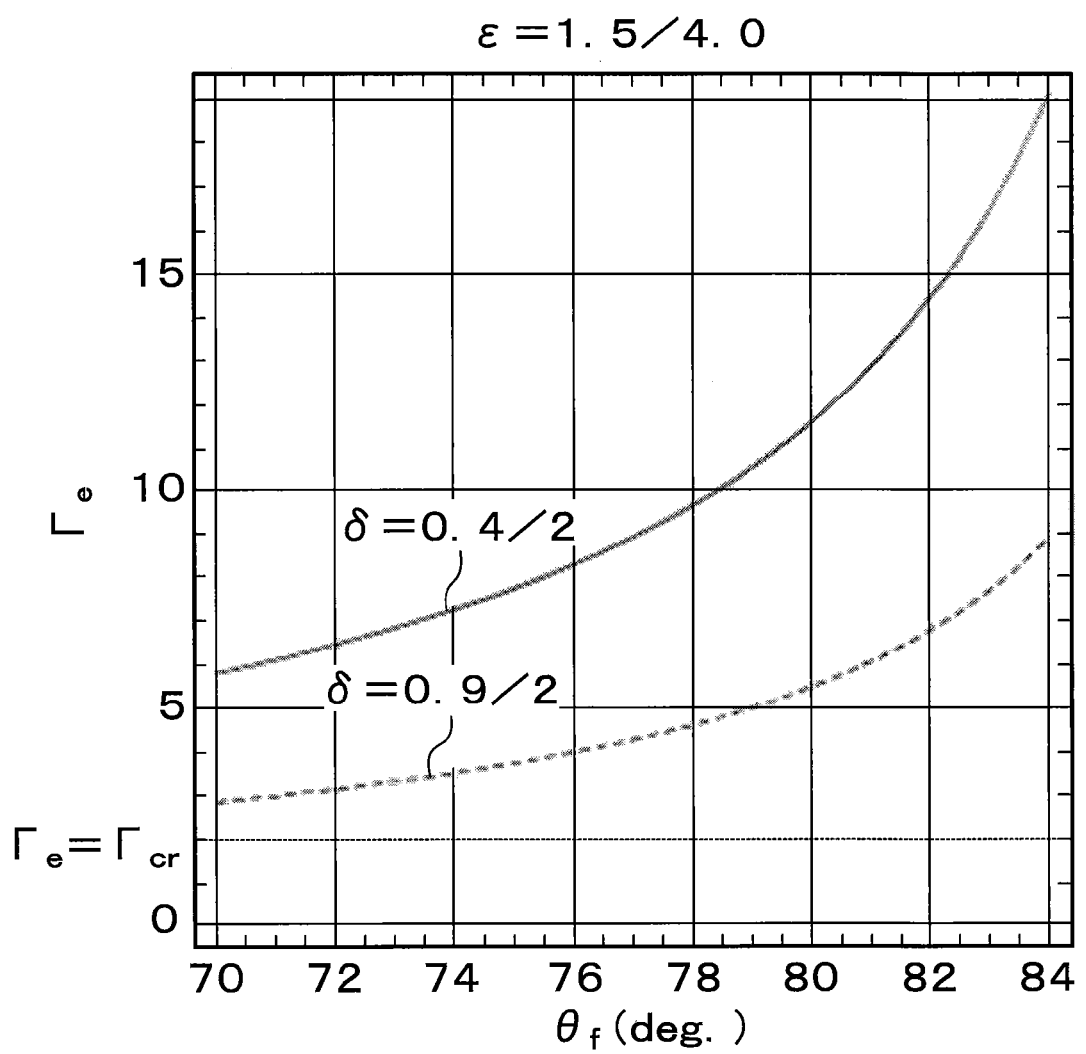
FIG. 8 explains the number of times of circulation in a flow constricting section of the vortex breakdown nozzle of the micro-bubble generator as the first embodiment of the present invention.

FIG. 8 shows variations, corresponding to $\theta_f$, of the number of times of circulation $\Gamma_e$ before the vortex breakdown takes place when ε=1.5/4.0, the variations having been determined with δ being changed to 0.4/2 and to 0.9/2. $\Gamma_{cr}$ in FIG. 8 is a critical number of times of circulation and it is 2.0 (in this micro-bubble generator, $\Gamma_{cr}\approx 2.0$; the mean value in a more popular swirling-flow generator is $\Gamma_{cr}\approx 1/0.65$ (cf. Spall et. al., Phys. Fluid, 30(11), pp. 3434-3440, 1987)). As shown in FIG. 8, as the depth of the groove 3d, that is, groove depth 3n=h, is larger, the circumferential momentum will be smaller in relation to an axial momentum with the result that the larger the groove depth 3n=h, namely, δ, the smaller the number of times of circulation $\Gamma_e$ will be. Thus, when the groove depth 3n=h is larger, the vortex breakdown will not easily take place.

Given the groove depth 3n (=h) and $\theta_f$, a minimum nozzle radius with which the vortex breakdown will take place, that is, a critical nozzle radius $\varepsilon_{cr}$ (will be $\varepsilon_{ecr}=r_{ecr}/R$ when the critical radius is $r_{ecr}$), will be given by the following expression (4) with $\Gamma_e$ being equal to $\Gamma_{cr}$:

$$\varepsilon_{cr} = \frac{\Gamma_{cr}}{\alpha_0 \frac{\pi^2}{4} + \alpha_1 \frac{\pi(3-3\delta+\delta^2)}{3\kappa\delta(2-\delta)^2}\tan\theta_f} .. \quad (4)$$

Therefore, designing the turbine vane type nozzle 3 and vortex breakdown nozzle 4 to meet $\varepsilon>\varepsilon_{cr}$ will permit to arise vortex breakdown in the vortex breakdown nozzle 4.

Figure 9:
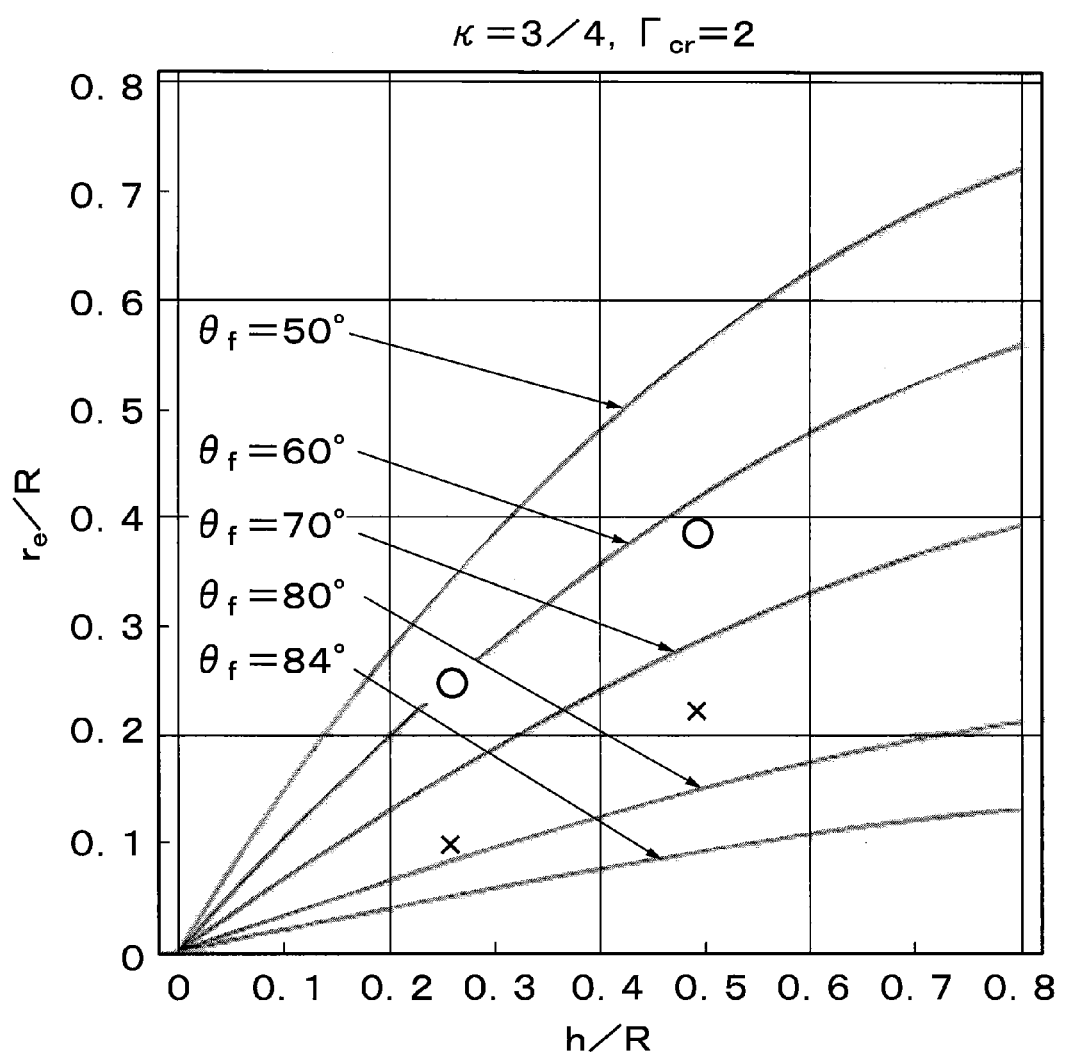
FIG. 9 explains a critical nozzle radius of the vortex breakdown nozzle of the micro-bubble generator as the first embodiment of the present invention.

FIG. 9 shows variations, corresponding to δ=h/R, of $\varepsilon=r_e/R$ of the vortex breakdown nozzle 4 when $\Gamma_{cr}$=2.0, the variations having been determined with $\theta_f$ being changed to 50, 60, 70, 80 and to 84 deg. and κ being ¾. In FIG. 9, the small circle "o" indicates that vortex breakdown took place with $\theta_f$ being 84 deg. and the small crisscross "x" indicates that no vortex breakdown took place with $\theta_f$ being 84 deg.

In brief, the diameter d of the micro bubbles 6d released under the effect of classification of the swirling flow 6c from the vortex breakdown section 4b of the vortex breakdown nozzle 4 is given by the following expression (5):

$$a \sim \sqrt{\frac{v_w}{\Gamma_e f_e}} \quad (5)$$

where $v_w$ is a coefficient of kinematic viscosity of the liquid 6. It will be seen from this expression that since $\Gamma_e \neq 0$ (1) in this expression, the smaller $v_w$ and the larger $f_e$, the finer the micro bubbles 6d will be.

When the power of a pump used to supply the pipe 2 with the liquid 6 is constant, the rotational frequency $f_e$ is given by the following expression (6):

$$f_e \sim \frac{Q}{R^3} \propto R^{-5/3} \quad (6)$$

Therefore, a high-lift pump (in which R is small) is of advantage for generating micro bubbles 6d with a higher rotational frequency $f_e$.

The gas feeding unit 5 is to supply the gas 5*l* to the microbubble generator 1. It is connected to the gas inlet 3*e* of the turbine vane type nozzle 3 and releases the gas column 6*b* from the jet orifice 3*f*. The pressure sensors 4*c* and 4*d*, respectively, are to detect the pressure inside the vortex breakdown section 4*b*. The pressure sensor 4*c* is provided at the side of the vortex breakdown section 4*b* where the latter is joined to the flow constricting section 4*a*, and the pressure sensor 4*d* is provided at the outlet of the vortex breakdown section 4*b*. A pressure difference is detected by these pressure sensors 4*c* and 4*d* for automatic adjustment of the feed rate of the gas 5*l*.

The gas feeding unit 5 includes a cylinder 5*a*, piston 5*b*, etc. The gas feeding unit 5 and the turbine vane type nozzle 3 and vortex breakdown nozzle 4 are connected to each other by connecting the gas inlet 3*e* and breather 5*f* to each other, pressure sensor 4*c* and high-pressure section 5*j* to each other, and the pressure sensor 4*d* and low-pressure section 5*k* to each other. The cylinder 5*a* is also the outer frame of the gas feeding unit 5. It is a nearly circular cylinder having a hollow space formed therein. The cylinder 5*a* is about 7.0 cm long and about 2.6 cm in diameter, for example, to which however the present invention is not limited.

The cylinder 5*a* has provided at the top thereof the breather 5*f* extending laterally through the cylinder 5*a*. The breather 5*f* is connected at one end thereof to the gas inlet 3*e* via a gas supply tube 5*i*. When opened, the other end of the breather 5*f* is supplied with the gas 5*l*. In case any special gas is to be used, a bomb containing the gas is to be connected to the other end of the breather 5*f*.

Also, the internal hollow space of the cylinder 5*a* is divided by the piston 5*b* and a diaphragm 5*m* into the high-pressure section 5*j* and low-pressure section 5*k*. The pressure inside the high-pressure section 5*j* at the front end of the cylinder 5*a* is detected by the pressure sensor 4*c*, while the pressure inside the low-pressure section 5*k* is detected by the pressure sensor 4*d*.

Note that the high- and low-pressure sections 5*j* and 5*k* have gas holes 5*g* and 5*h*, respectively, formed therein. The gas holes 5*g* and 5*h* are normally closed. By opening them, the internal gas can be discharged from inside the cylinder 5*a*.

The piston 5*b* reciprocally moves inside the cylinder 5*a*. It includes a moving portion 5*c*, spring 5*d* and stopper 5*e*, etc. As the piston 5*b* moves, the rate at which the gas 5*l* is fed to the gas inlet 3*e* is adjusted. The moving portion 5*c* moves back and forth inside the cylinder 5*a*. It includes a stake-shaped former half that opens and closes the gas inlet 3*e* and a cylindrical latter half that isolates the high- and low-pressure sections 5*j* and 5*k* inside the cylinder 5*a* from each other. When the moving portion 5*c* has moved to the foremost position, the free end of the stake-shaped former portion thereof will go beyond the breather 5*f* and close the latter against passage of the gas 5*l*. When the moving portion 5*c* has moved to the backmost position, the free end of the former portion will leave the breather 5*f* and allow the gas 5*l* to pass through the breather 5*f*.

The spring 5*d* expands and constricts to control the movement of the moving portion 5*c*. It adjusts the position of the moving portion 5*c* in conjunction with a difference in pressure between the high- and low-pressure sections 5*j* and 5*k*. When the pressure in the high-pressure section 5*j* increases, the spring 5*d* contracts to move the moving position 5*c* rearward. On the other hand, when the pressure in the low-pressure section 5*k* increases, the spring 5*d* expands to move the moving portion 5*c* frontward.

The stopper 5*e* is to support the piston 5*b* by fixing the end of the piston 5*b* to the back of the cylinder 5*a*. When retained by the stopper 5*e*, the piston 5*b* is stabilized inside the cylinder 5*a* and the spring 5*d* can effectively expands and constrict to move the moving portion 5*c*.

The moving portion 5*c* and stopper 5*e* are connected to each other by means of the spring 5*d* so that the moving portion 5*c* and stopper 5*e* are slidable inside the spring 5*d*. Thus, the spring 5*d* can be stabilized and the moving range of the moving portion 5*c* can be controlled.

The gas feeding unit 5 is to control the supply of the gas 5*l* by moving the piston 5*b* correspondingly to a difference in pressure between the high- and low-pressure sections 5*j* and 5*k*. The high- and low-pressure sections 5*j* and 5*k* are connected to each other by means of the pressure sensors 4*c* and 4*d* and tubes 5*n* and 5*o* so that the pressure difference will reflect the pressure in the vortex breakdown section 4*b* of the vortex breakdown nozzle 4. More specifically, it is when the vortex breakdown is taking place in a portion, extending between the pressure sensors 4*c* and 4*d*, of the vortex breakdown section 4*b* that the difference between the pressures detected by the pressure sensors 4*c* and 4*d* increases. When the difference between the pressures detected by the high- and low-pressure sections 5*j* and 5*k* is larger than the reactive force of the spring 5*d*, the piston 5*b* moves rightward until the breather 5*f* is opened.

Note here that it is when no vortex breakdown takes place in the portion of the vortex breakdown section 4*b* which extends between the pressure sensors 4*c* and 4*d* that the gas is fed at a high rate to the gas inlet 3*e* and the pressure difference between the pressure sensors 4*c* and 4*d* is small. To control the gas feed rate, the piston 5*b* should be so positioned that the moving portion 5*c* thereof will close the breather 4*f* when the pressure in the high-pressure section 5*j* is in equilibrium with that in the low-pressure section 5*k*.

Figure 10A:
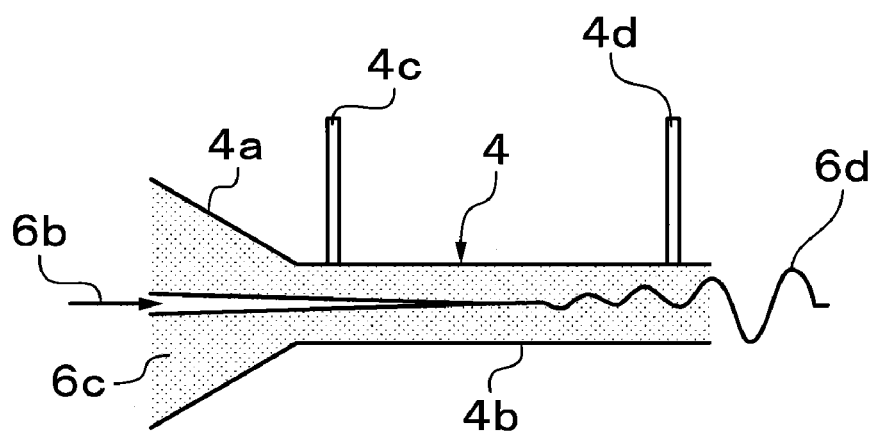
FIGS. 10A and 10B are schematic diagrams, respectively, of vortex breakdown taking place in the vortex breakdown nozzle of the micro-bubble generator as the first embodiment of the present invention.
Figure 10B:
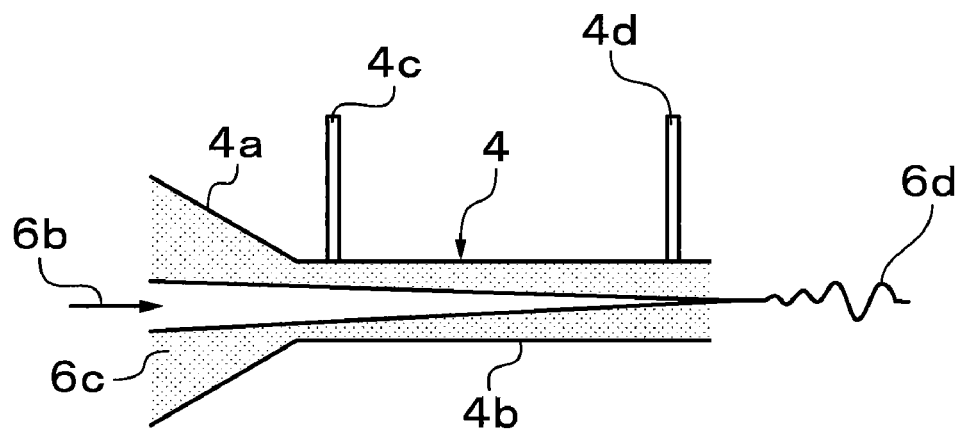

FIGS. 10A and 10B show vortex breakdown taking place in the vortex breakdown nozzle 4. FIG. 10A shows the state of the vortex breakdown nozzle 4 when vortex breakdown takes place, and FIG. 10B shows the state of the vortex breakdown nozzle 4 when no vortex breakdown takes place. In case vortex breakdown takes place as shown in FIG. 10A, the gas column 6*b* having come from the flow constricting section 4*a* is vortex-broken down in the middle of the vortex breakdown section 4*b* and goes out as micro bubbles 6*d* from the vortex breakdown section 4*b*, so that the pressure at the outlet of the vortex breakdown section 4*b* will be lower than that at the inlet of the latter.

The pressure at the inlet of the vortex breakdown section 4*b* is detected by the pressure sensor 4*c* while the pressure at the outlet is detected by the pressure sensor 4*d*. When there is found a pressure difference in the vortex breakdown section 4*b*, which means that vortex breakdown is normally taking place, the gas will continuously be fed at a current rate.

In case no vortex breakdown is taking place, the gas column 6*b* having come from the flow constricting section 4*a* will not be vortex-broken down in the vortex breakdown section 4*b*, resulting in no micro bubbles 6*d* as will be seen in FIG. 10B. In this case, the pressure at the outlet of the vortex breakdown section 4*b* is almost the same as that at the inlet. At this time, the pressure at the inlet of the vortex breakdown section 4*b* is detected by the pressure sensor 4*c* while the pressure at the outlet is detected by the pressure sensor 4*d*. When no pressure difference is found in the vortex breakdown section 4*b*, the gas feeding is controlled for giving rise to vortex breakdown.

As above, if the gas feed rate is not appropriate, the gas column 6*b* will not be vortex-broken down, which will thus result in no micro bubbles 6*d*. In this example, it can be checked based on a pressure difference in the vortex breakdown section 4*b* whether the gas column 6*b* is vortex-broken down, and the gas feed rate can automatically be adjusted based on the pressure difference as above.

Next, there will be explained the relation between the feed rate $Q_a$ of the gas 5l (gas flow rate) and diameter d of the micro bubbles 6d.

Figure 11:
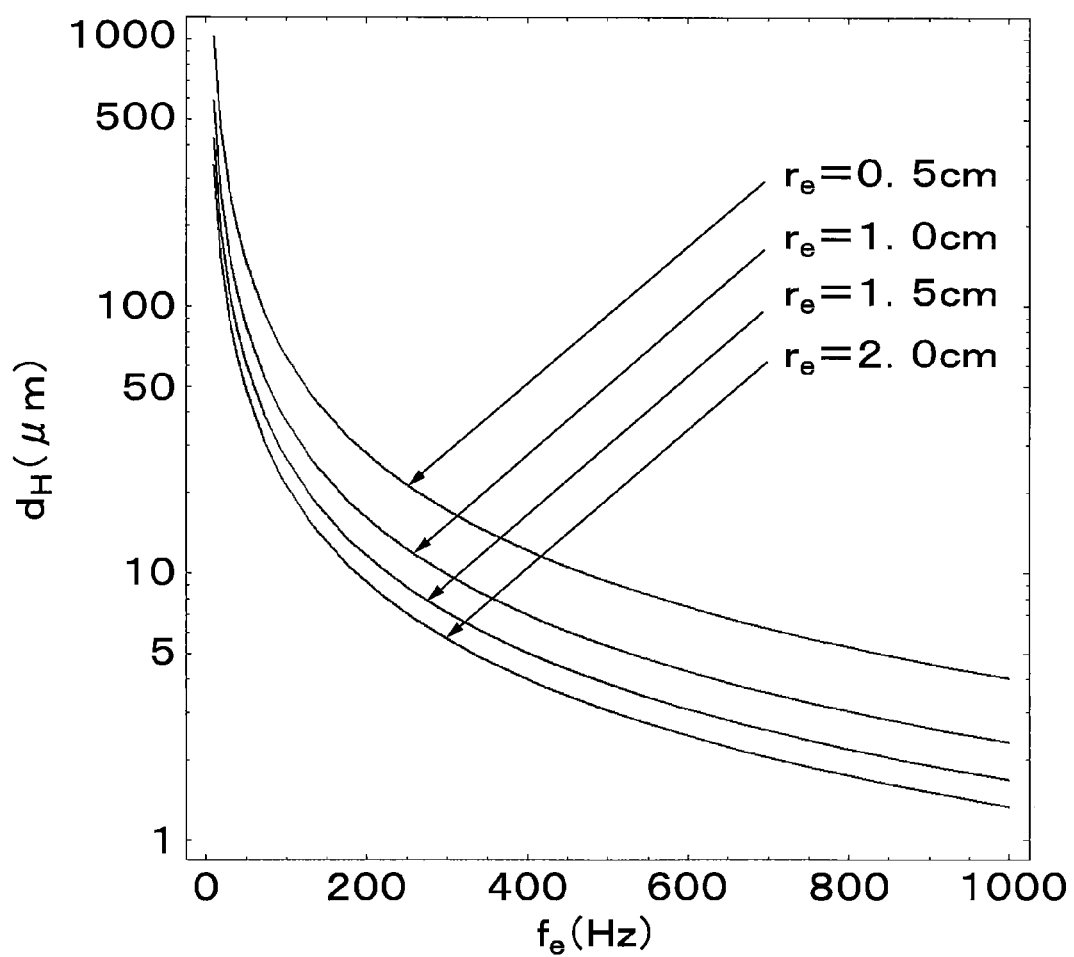
FIG. 11 explains the Hinze scale.

The gas column 6b adhering to the front face of the vortex breakdown nozzle 4 will be sheared into air bubbles. The diameter of the air bubbles was calculated based on the Hinze scale (diameter $d_H$ of the air bubble when the action of segmentation by the pressure and surface tension is in equilibrium with each other). The results of calculation are shown in FIG. 11. In brief, the feed rate $Q_a$ of the gas 5l when the micro bubbles 6d are broken into finer pieces of Hinze scale $d_H$ is given by the following expression (7):

$$Q_a = 0.29\sqrt{1+\Gamma_e^2}\, r_e \omega_e d_0^2 \tag{7}$$

where $d_0$ is calculated based on the following expressions (8) to (10):

$$f_e = 1.8\left(\frac{\gamma}{\rho}\right)^{1/2} \Gamma_e^{-5/4} r_e^{-3/2} F(d_{n0})^{5/4}. \tag{8}$$

$$d_{n0} \equiv \frac{d_0}{d_H}. \tag{9}$$

$$d_H = 1.3\left(\frac{\gamma^3}{r_e^4 \omega_e^6 \rho^3}\right)^{1/5}. \tag{10}$$

where $\gamma$ is a coefficient of tension of the boundary between the gas 5l and liquid 6.

In the expression (8), $F(x)$ is given by the following expression (11):

$$F(x) \equiv \int_1^x \sqrt{\frac{x_1}{x_1^{5/3}-1}}\, dx_1. \tag{11}$$

Figure 12:
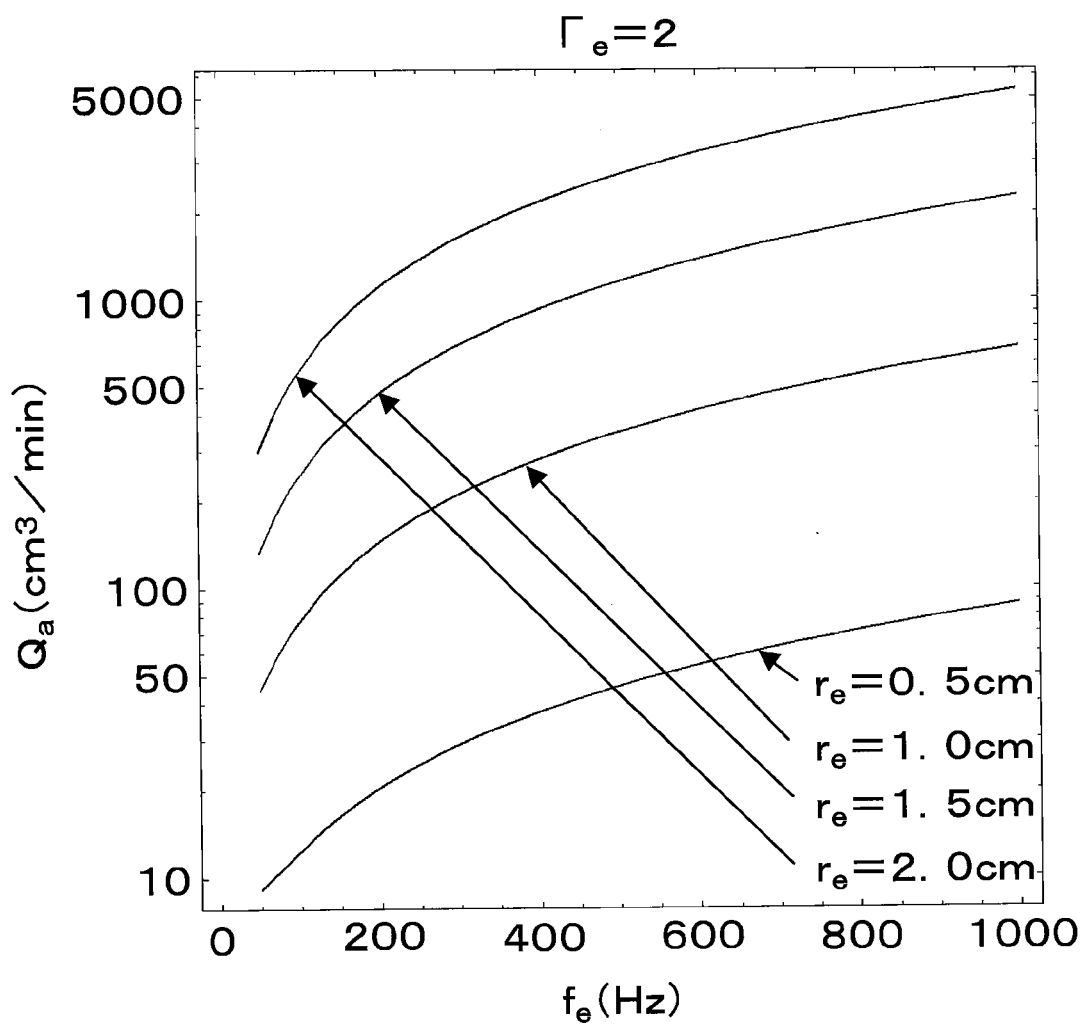
FIGS. 12, 13 and 14 schematically illustrate the gas feed rates, respectively, for breaking down micro bubbles of the Hinze scale when the numbers of times of circulation are 2, 3 and 4, respectively, in the micro-bubble generator as the first embodiment of the present invention.
Figure 13:
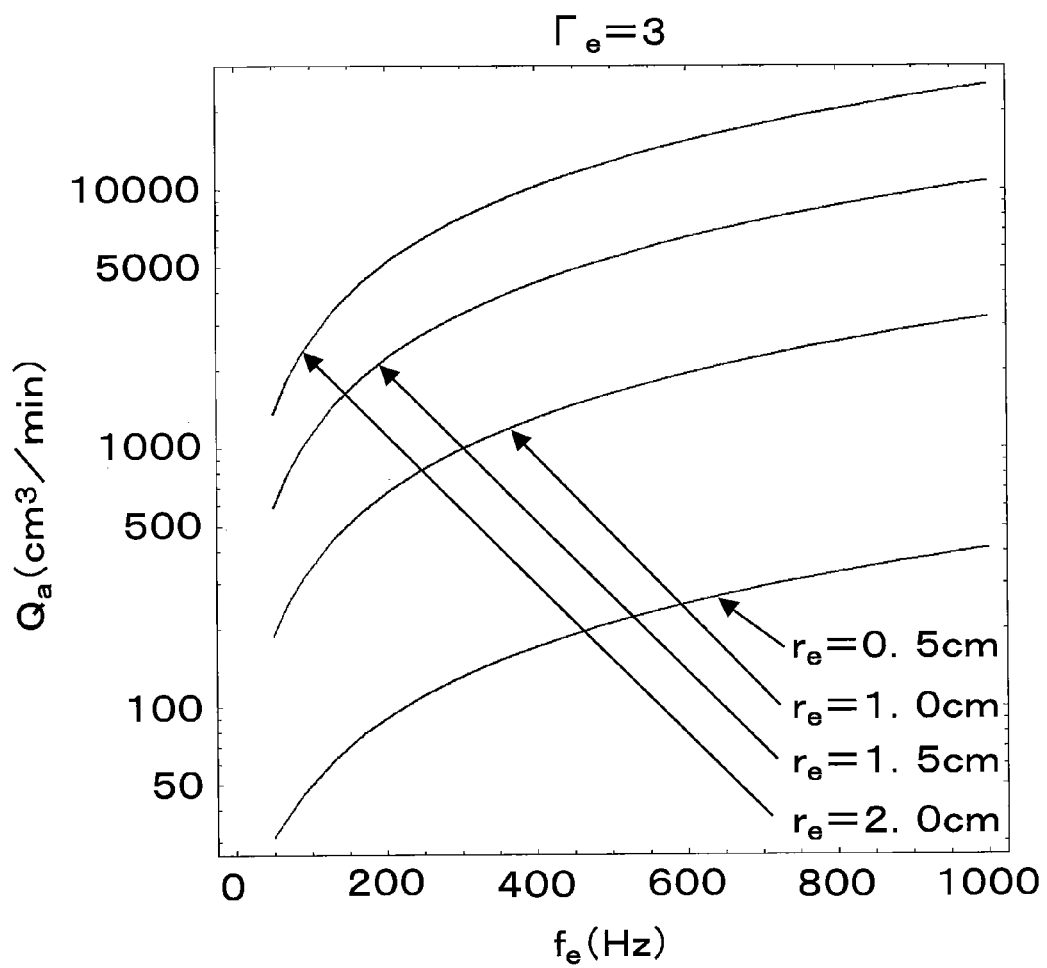
Figure 14:
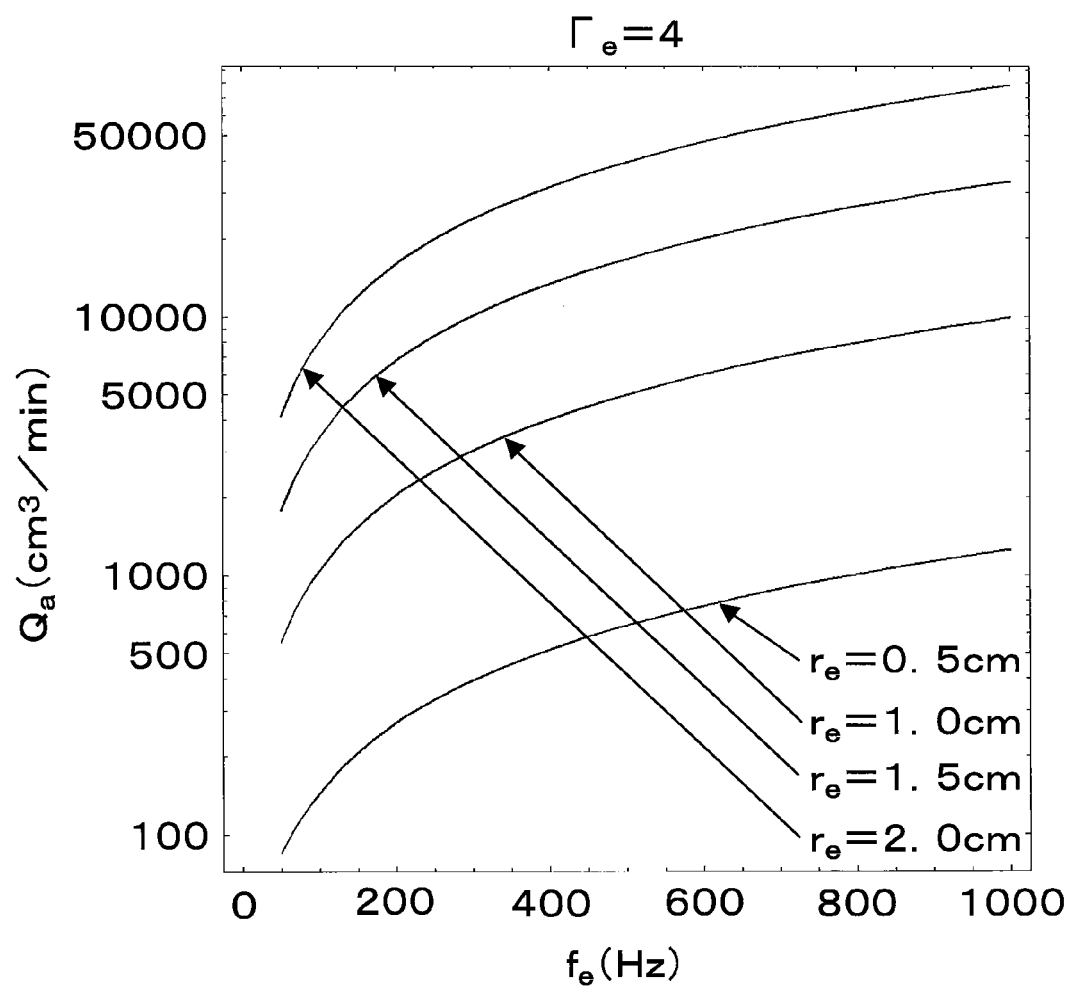

FIGS. 12, 13 and 14 show the gas feed rates $Q_a$ when the number $\Gamma_e$ of times of circulation is 2, 3 and 4, respectively.

The ratio between the gas feed rate $Q_a$ and flow rate $Q_w$ of the liquid 6, for generating the Hinze-scale micro bubbles 6d, is given by the following expression (12):

$$\frac{Q_a}{Q_w} = 0.9\Gamma_e \sqrt{1+\Gamma_e^2}\left(\frac{d_0}{r_e}\right)^2, \quad Q_w = \pi r_e^2 u_e. \tag{12}$$

Figure 15:
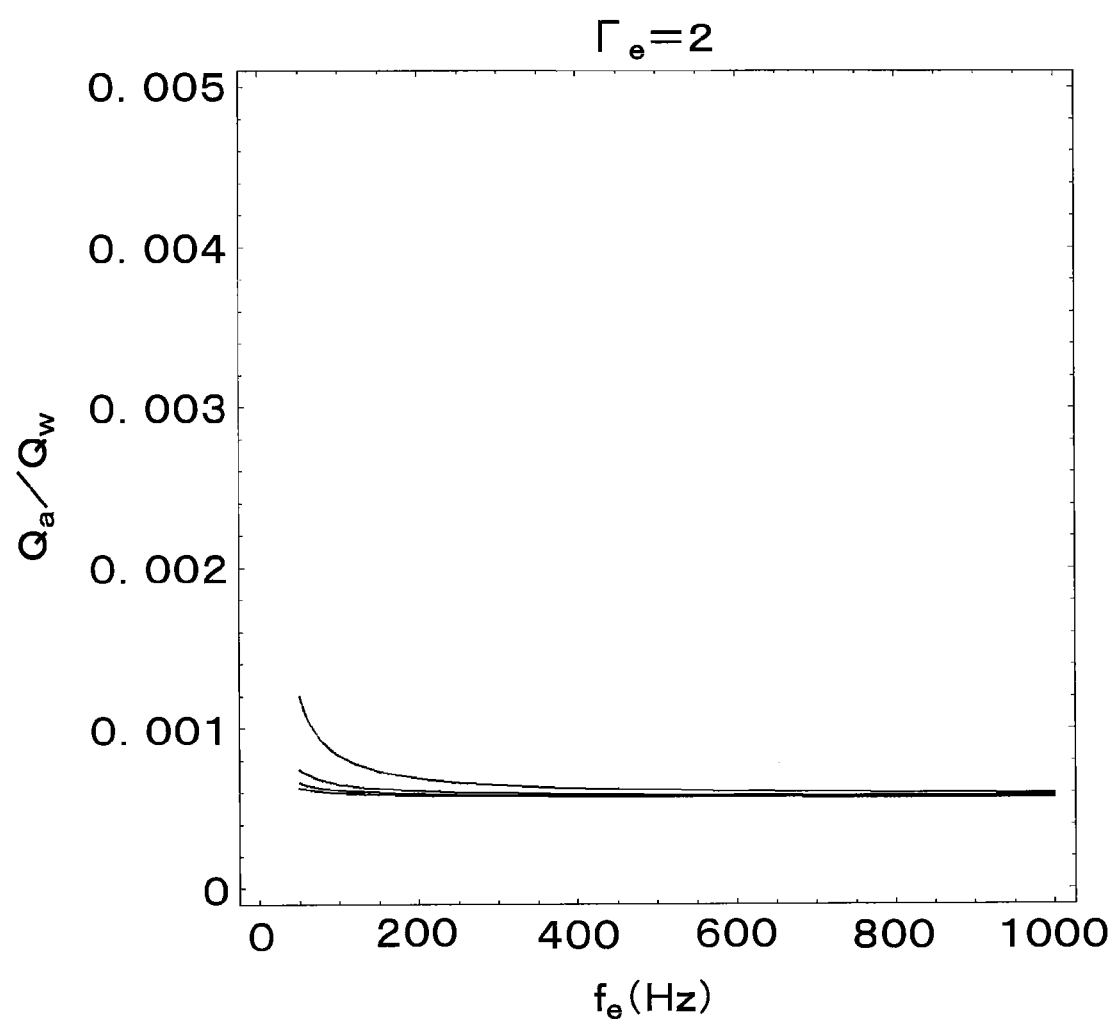
FIGS. 15, 16 and 17 schematically illustrate ratios, respectively, between the gas and liquid feed rates for breaking down micro bubbles of the Hinze scale when the numbers of times of circulation are 2, 3 and 4, respectively, in the micro-bubble generator as the first embodiment of the present invention.
Figure 16:
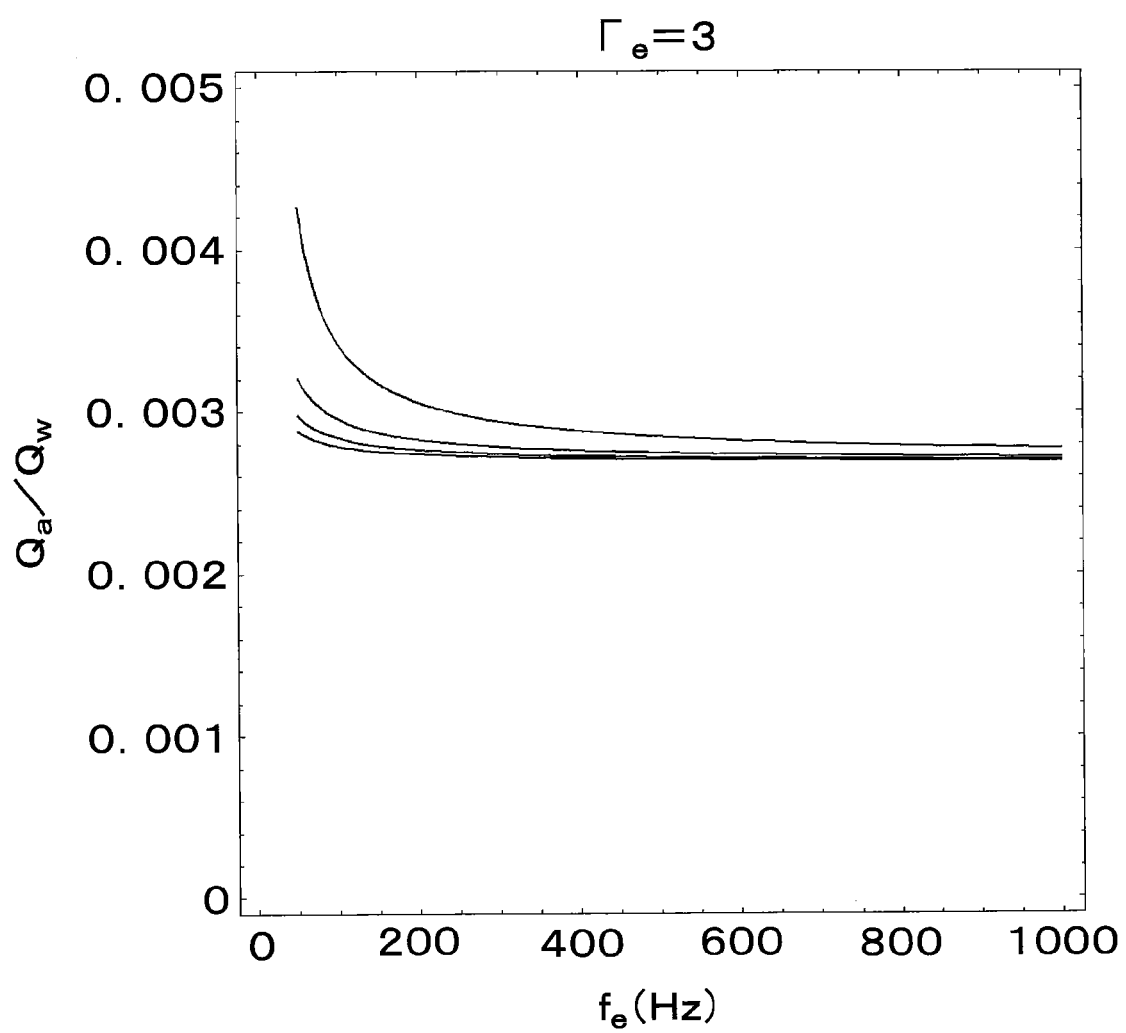
Figure 17:
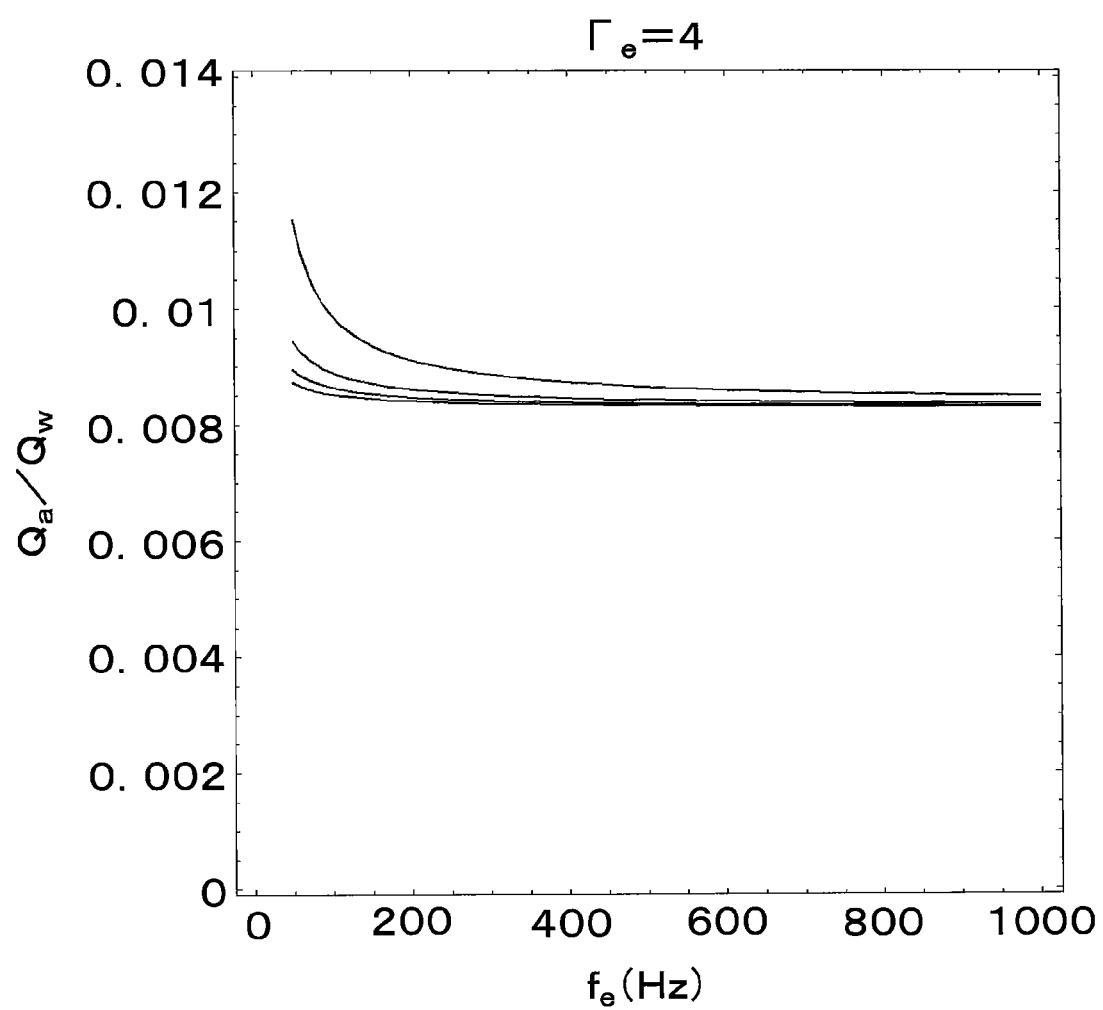

FIGS. 15, 16 and 17 show plotted ratios between the feed rate $Q_a$ of the gas 5l and that $Q_w$ of the liquid 6 when the numbers $\Gamma_e$ of times of circulation are 2, 3 and 4, respectively. As will be seen from FIGS. 15, 16 and 17, when $f_e > 100$ Hz and $r_e < 2$ cm, the ratio $Q_a/Q_w$ will not depend so much on $f_e$ and $r_e$. At this time, an asymptotic calculation of the ratio $Q_a/Q_w$ is given by the following expression (13):

$$\frac{Q_a}{Q_w} = 0.00003 \Gamma_e^3 \sqrt{1+\Gamma_e^2}. \tag{13}$$

The above expression (13) was verified with the experimental ratio $Q_a/Q_w$ of about 0.005 with the number of times of circulation $\Gamma_e$ of about 2.5 (see Yamada et al., Fluid Mechanics Society, Annual Meeting 2005 Conference Paper, AM05-24-002).

At the outlet edge of the vortex breakdown nozzle 4, separation of the swirling flow 6c will cause a sound. However, the sound can be deadened by attaching fine fibers (such as cotton fibers) to the outlet edge or by stretching wires (of a few millimeters in diameter, for example) at the inlet of the flow constricting section 4a of the vortex breakdown nozzle 4 in the diametric direction to disturb the upstream gas column 6b, for example.

Referring now to FIG. 18, there will be explained examples of the turbine vane type nozzle 3. FIG. 18 shows examples 1 to 3 of the turbine vane type nozzle 3. The items common to the three examples include "No. of vanes", "Vane interval" and "Vane angle". The vanes 3b are six in number, and the vanes 3b are disposed equidistantly from each other. Thus, the vane interval 3g is 60 deg. The vane angle 3h is 15 deg. The gradient 3s is 84 deg., as having previously been mentioned, which is common to all these examples 1 to 3.

In the example 1, the outside radius 3l of the hemispheric portion 3c is 0.85 cm, vane length 3k is 2.03 cm, and groove depth 3n is 0.3 cm. Being a sum of the vane length 3k and outside radius 3l, the nozzle length 3i is 2.88 cm. Since the inside radius 3m is smaller than the outside radius 3l by the groove depth 3n, it is 0.55 cm. Because the outside radius 3l is 0.85, the circumference of the body 3a is 5.34 cm long. Thus, the vane is 0.22 cm wide because the vane angle 3h is 15 deg. Since the vane interval 3g is 60 deg., the groove width is 0.89 cm. The arc angle of the vane 3b can be given by an expression of $67.4 \times (-0.0369 + 0.780/(2.11 - \text{position}))$. It should be noted that the position is a distance from the vane end, ranging from 0 to the vane length 3k. For example, when the position is 0, the arc angle of the vane 3b is 0 deg. When the position is the vane length 3k, the arc angle of the vane 3b is 63.2 deg.

In the example 2, the outside radius 3l of the hemispheric portion 3c is 1.6 cm, vane length 3k is 3.82 cm, and groove depth 3n is 0.5 cm. Being a sum of the vane length 3k and outside radius 3l, the nozzle length 3i is 5.42 cm. Since the inside radius 3m is smaller than the outside radius 3l by the groove depth 3n, it is 1.1 cm. Because the outside radius 3l is 1.6 cm, the circumference of the body 3a is 10.05 cm long. Thus, the vane is 0.42 cm wide because the vane angle 3h is 15 deg. Since the vane interval 3g is 60 deg., the groove width is 1.68 cm. The arc angle of the vane 3b can be given by an expression of $35.8 \times (-0.0695 + 0.276/(3.98 - \text{position}))$. It should be noted that the position is a distance from the vane end, ranging from 0 to the vane length 3k. For example, when the position is 0, the arc angle of the vane 3b is 0 deg. When the position is the vane length 3k, the arc angle of the vane 3b is 59.3 deg.

In the example 3, the outside radius 3l of the hemispheric portion 3c is 2.1 cm, vane length 3k is 5.00 cm, and groove depth 3n is 0.5 cm. Being a sum of the vane length 3k and outside radius 3l, the nozzle length 3i is 7.10 cm. Since the inside radius 3m is smaller than the outside radius 3l by the groove depth 3n, it is 1.6 cm. Because the outside radius 3l is 2.1, the circumference of the body 3a is 13.19 cm long. Thus, the vane is 0.55 cm wide because the vane angle 3h is 15 deg. Since the vane interval 3g is 60 deg., the groove width is 2.20 cm. The arc angle of the vane 3b can be given by an expression of $27.3 \times (-0.0912 + 0.476/(5.22 - \text{position}))$. It should be noted that the position is a distance from the vane end, ranging from 0 to the vane length 3k. For example, when the position is 0, the arc angle of the vane 3b is -3.3 deg. When the position is the vane length 3k, the arc angle of the vane 3b is 56.6 deg.

Figure 19A:
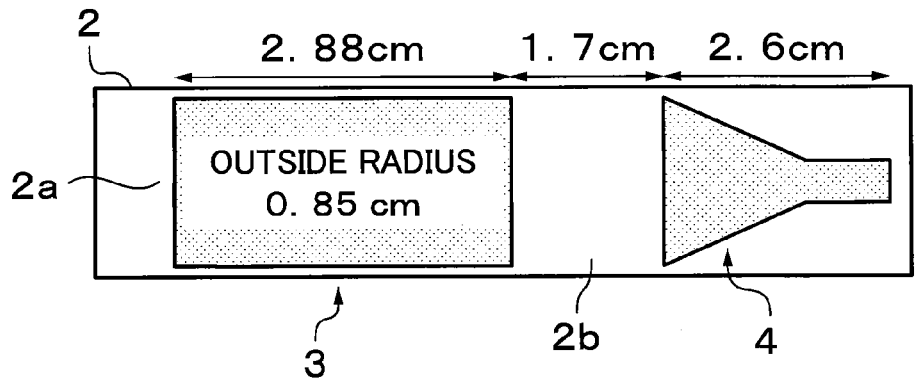
FIGS. 19A, 19B and 19C schematically show examples of the shape of the turbine vane type nozzle, shape of the vortex breakdown nozzle and distance from the turbine vane type nozzle to vortex breakdown nozzle in the micro-bubble generator as the first embodiment of the present invention.
Figure 19B:
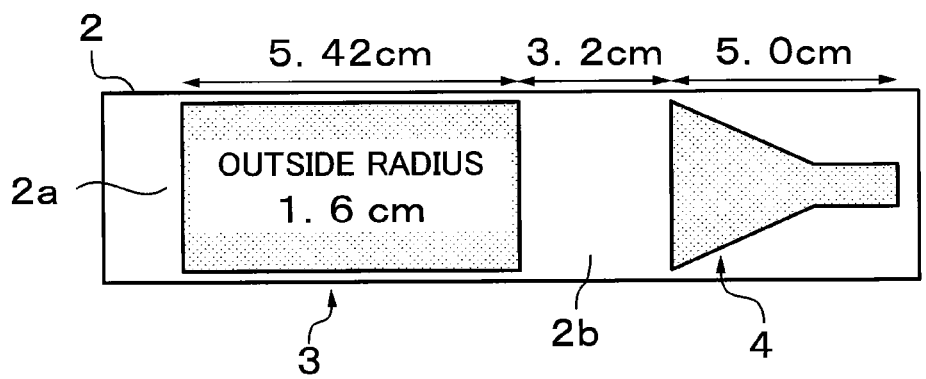
Figure 19C:
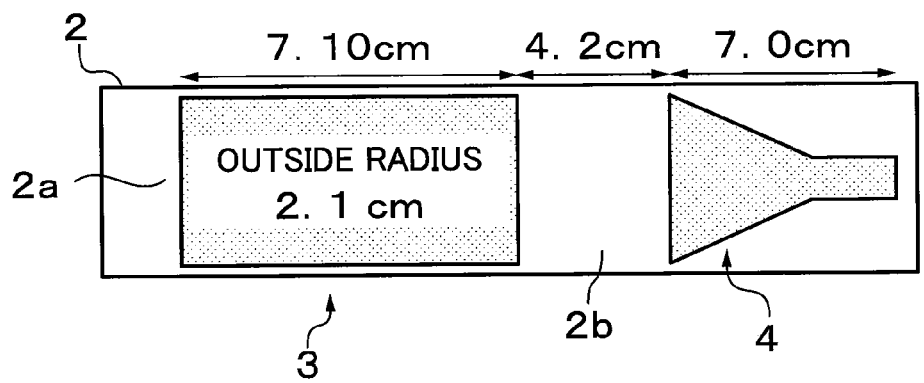

FIGS. 19A, 19B and 19C show geometric data such as shapes of the turbine vane type nozzle 3 and vortex breakdown nozzle 4 and distance from the turbine vane type nozzle 3 to vortex breakdown nozzle 4 in examples 4 to 6 of the turbine vane type nozzle 3. The example 4 of the turbine vane type nozzle 3 is similar to the example 1, the example 5 is similar to the example 2, and the example 6 is similar to the example 3.

In the example 4 of the turbine vane type nozzle 3 (as in FIG. 19A), the outside radius 3*l* is about 0.85 cm, and nozzle length is 2.88 cm. Since the turbine vane type nozzle 3 is closely fitted in the pipe 2, the inside diameter of the pipe 2 is also about 0.85 cm and inlet-side diameter of the vortex breakdown nozzle 4 is similarly about 0.85 cm. When the swirling section 2*b* extending from the turbine vane type nozzle 3 to the vortex breakdown nozzle 4 is about 1.7 cm long and vortex breakdown nozzle 4 is about 2.6 cm long, the total length of the turbine vane type nozzle 3, swirling section 2*b* and vortex breakdown nozzle 4 is about 7.18 cm. It should be noted that when the vortex breakdown nozzle 4 is shaped such that the angle 4*e* of the swirling section 4*a* is 20 deg. and outlet-side inside diameter 4*f* is 0.5 cm, the inlet-side diameter will be 0.85 cm, upon which the length of the vortex breakdown section 4*b* etc. depends.

In the example 5 of the turbine vane type nozzle 3 (as in FIG. 19B), the outside radius 3*l* is about 1.6 cm, and nozzle length is 5.42 cm. Since the turbine vane type nozzle 3 is closely housed in the pipe 2, the inside diameter of the pipe 2 is also about 1.6 cm and inlet-side diameter of the vortex breakdown nozzle 4 is similarly about 1.6 cm. When the swirling section 2*b* extending from the turbine vane type nozzle 3 to the vortex breakdown nozzle 4 is about 3.2 cm long and vortex breakdown nozzle 4 is about 5.0 cm long, the total length of the turbine vane type nozzle 3, swirling section 2*b* and vortex breakdown nozzle 4 is about 13.62 cm. It should be noted that when the vortex breakdown nozzle 4 is shaped such that the angle 4*e* of the swirling section 4*a* is 20 deg. and outlet-side inside diameter 4*f* is 1.0 cm, the inlet-side diameter will be 1.6 cm, upon which the length of the vortex breakdown section 4*b* etc. depends.

In the example 6 of the turbine vane type nozzle 3 (as in FIG. 19C), the outside radius 3*l* is about 2.1 cm, and nozzle length is 7.10 cm. Since the turbine vane type nozzle 3 is closely housed in the pipe 2, the inside diameter of the pipe 2 is also about 2.1 cm and inlet-side diameter of the vortex breakdown nozzle 4 is similarly about 2.1 cm. When the swirling section 2*b* extending from the turbine vane type nozzle 3 to the vortex breakdown nozzle 4 is about 4.2 cm ling and vortex breakdown nozzle 4 is about 7.0 cm long, the total length of the turbine vane type nozzle 3, swirling section 2*b* and vortex breakdown nozzle 4 is about 18.3 cm. It should be noted that when the vortex breakdown nozzle 4 is shaped such that the angle 4*e* of the swirling section 4*a* is 20 deg. and outlet-side inside diameter 4*f* is 1.5 cm, the inlet-side diameter will be 2.1 cm, upon which the length of the vortex breakdown section 4*b* etc. depends.

In the examples 4 to 6, the dimensions of the pipe 2 are of preferred values for generating the micro bubbles 6*d*. The sizes of the turbine vane type nozzle 3 and vortex breakdown nozzle 4 have to be adjusted correspondingly to the size of the pipe 2.

As above, the turbine vane type nozzle 3 and vortex breakdown nozzle 4 included in the micro-bubble generator 1 are disposed linearly according to the first example of the first embodiment. Thus, this apparatus can be designed small or large as well for easy connection to existing equipment that uses micro bubbles. Also, since the gas feeding unit 5 is used to feed the gas 5*l* to the gas inlet 3*e* of the turbine vane type nozzle 3, the gas feed rate can automatically be adjusted correspondingly to a pressure variation in the vortex breakdown section 4*b* of the vortex breakdown nozzle 4 to stably give rise to vortex breakdown for generation of the microbubbles 6*d*. Also, since the mechanism of generating the micro bubbles 6*d* is well known, it is possible to design the micro-bubble generator 1 correspondingly to the performance of a pump used for supplying the liquid 6 to the pipe 2.

Next, there will be explained the micro-bubble generator as the second embodiment of the present invention.

Figure 20:
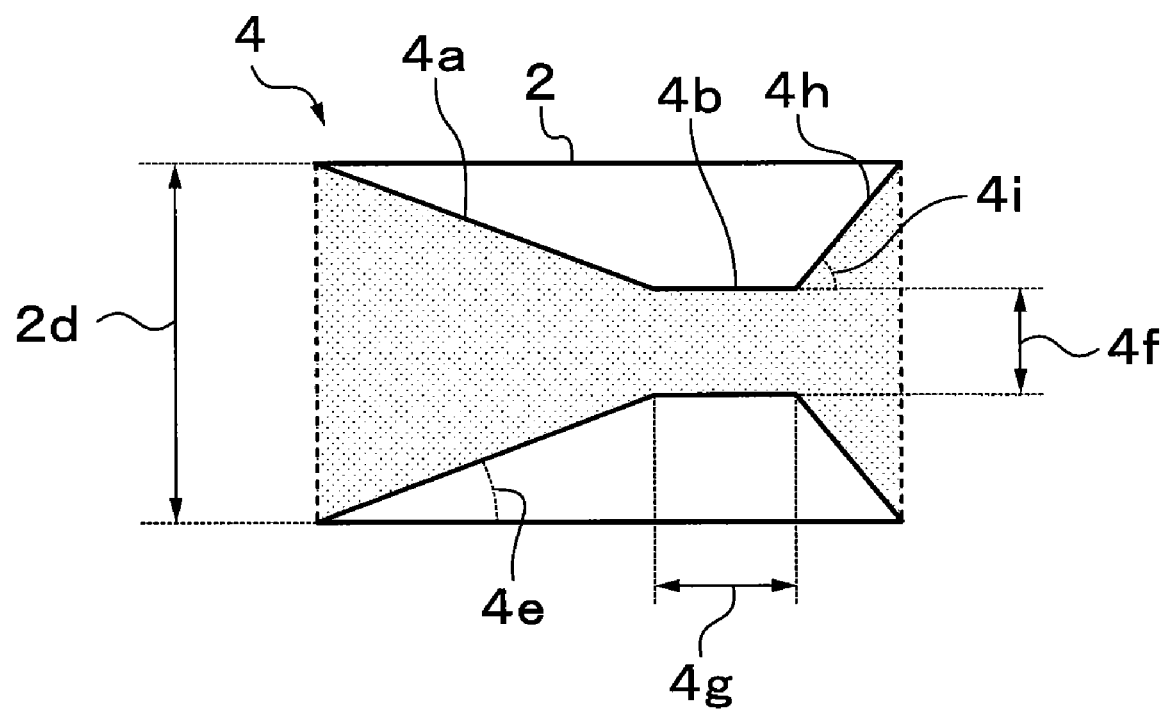
FIG. 20 is an axial-sectional view of a vortex breakdown nozzle used in a micro-bubble generator as a second embodiment of the present invention.

In the micro-bubble generator 1, the vortex breakdown section 4*b* of the vortex breakdown nozzle 4 has provided at the end thereof an inverse-tapered (or divergent) section 4*h* that provides a wide outlet as shown in FIG. 20. More specifically, in the vertex breakdown nozzle 4 of the micro-bubble generator 1 as the first example of the first embodiment, the angle 4*i* of the outlet end of the vortex breakdown section 4*b* is 0 deg. while the vortex breakdown nozzle 4 of the micro-bubble generator 1 as the second example of the first embodiment has the inverse-tapered section 4*h* that provides a sufficiently wide outlet having the angle (taper angle) 4*i*. More specifically, the angle 4*i* is on the order of 60 or 80 deg., for example, to which however the present invention is not limited.

In the vortex breakdown nozzle 4 in the first embodiment of the present invention, the gas column 6*b* developed nearly at the center of the swirling flow 6*c* in the swirling section 2*b* has the velocity thereof increased in the flow constricting section 4*a* and is thus atomized in the vortex breakdown section 4*b* to generate the microbubbles 6*d*. In the vortex breakdown nozzle 4 included in the second embodiment of the present invention, however, the gas column 6*b* passes through the vortex breakdown section 4*b* and adheres as air bubbles to the inner surface of the inverse-tapered section 4*h* under the Coanda effect. The air bubbles adhering to the inner surface of the inverse-tapered section 4*h* are sheared or broken down by the swirling flow 6*c* coming from the swirling section 2*b* to produce the micro bubbles 6*d*. Namely, adhesion of the air bubbles to the inner surface of the inverse-tapered section 4*h* will cause the air bubbles to be sheared for an increased length of time, which will promote the atomization of the air bubbles.

Note here that the "Coanda effect" is such that when an object is placed in a flow, the flow will have its direction changed along the placed objected. The swirling flow 6*c* having come from the vortex breakdown section 4*b* into the inverse-tapered section 4*h* will diverge and the gas column 6*b* will also be divergent, so that the air bubbles will adhere to the inner surface of the inverse-tapered section 4*h*.

Concerning the dimensions of the vortex breakdown nozzle 4 in the second example of the first embodiment, the inside diameter of the inlet of the flow constricting section 4*a* (=inside diameter 2*d* of the pipe 2), angle 4*e* of the flow constricting section 4*a* and inside diameter 4*f* of the vortex breakdown section 4*b* are similar to those of the vortex breakdown nozzle 4 in the first embodiment of the present invention, but the length 4*g* of the cylindrical vortex breakdown section 4*b* is nearly the same as the inside diameter 4*f*.

Figure 21A:
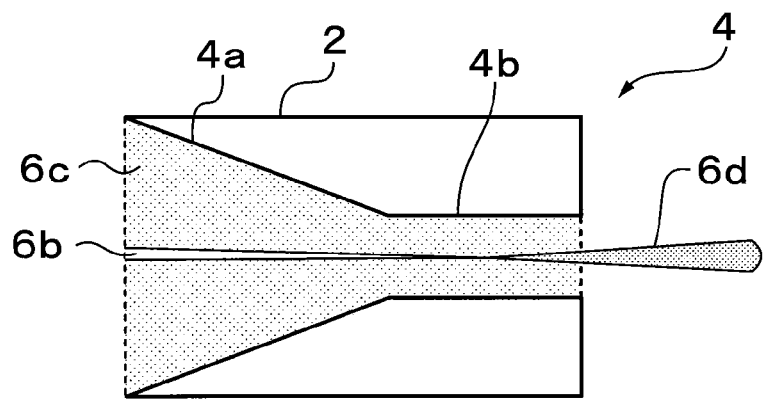
FIGS. 21A, 21B and 21C are schematic diagrams, respectively, showing a comparison in manner of generating micro bubbles between the micro-bubble generator as the second embodiment of the present invention.
Figure 21B:
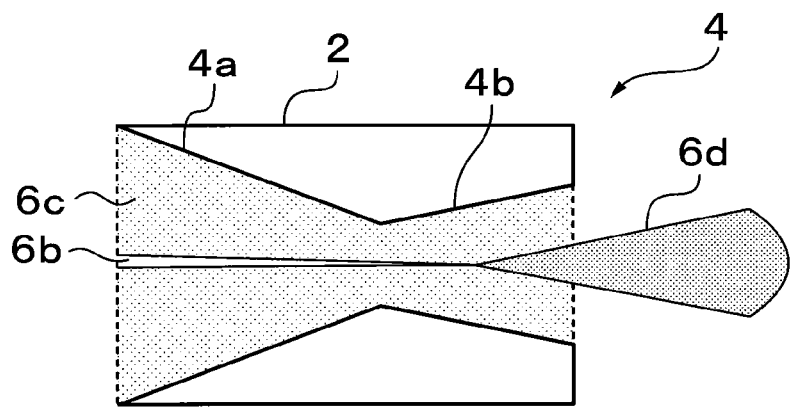
Figure 21C:
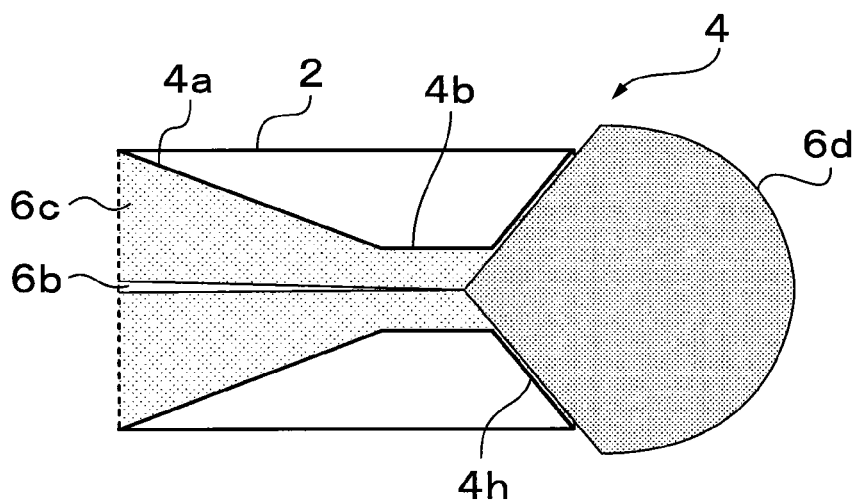

FIGS. 21A, 21B and 21C show, for comparison, how the micro-bubble generator 1 generates the micro bubbles 6*d* with the vortex breakdown section 4*b* being changed in shape.

In the vortex breakdown nozzle 4 in the first example of the first embodiment, the gas column 6*d* having come from the swirling section 2*b* of the pipe 2 into the flow constricting section 4*a* is vortex-broken down in the vortex breakdown section 4*b* to generate the micro bubbles 6*d* which will however spread only in a narrow linear range as shown in FIG. 21A.

In the vortex breakdown nozzle 4 shown in FIG. 21B, the vortex breakdown section 4b as a whole is inverse-tapered. The micro bubbles 6d generated in the inverse-tapered portion spreads only in a range a little wider than that in FIG. 21A.

In the vortex breakdown nozzle 4 shown in FIG. 21C, the air bubbles adhering to the inner surface of the inverse-taped portion 4h are sheared or broken down to generate the micro bubbles 6d which will thus spread divergently in a very wide range.

FIGS. 22A and 22B show two types of vortex breakdown. As shown in both FIGS. 22A and 22B, the inverse-tapered section 4h at the outlet of the vortex breakdown nozzle 4 is formed to spread at a large angle which will cause the vortex to be unstable and broken down. In the vortex breakdown shown in FIG. 22A, the minimum section of the vortex breakdown section 4b of the vortex breakdown nozzle 4 gives rise to such a supercritical flow that the disturbance will not be propagated toward the upstream. In the vortex breakdown shown in FIG. 22B, the flow is subcritical over the vortex breakdown nozzle 4 so that the disturbance will be propagated to the upstream.

The second embodiment of the present invention has the following advantages in addition to those similar to the advantages of the first embodiment of the present invention. That is, owing to the inverse-tapered section 4h at the end of the vortex breakdown section 4b of the vortex breakdown nozzle 4, the swirling flow 6c will adhere to the inner surface of the inverse-tapered section 4h. Thus, the micro bubbles 6d can be generated with an improved efficiency and thus the blown-out direction of the micro bubbles 6d can easily be controlled by selecting an appropriate angle 4i of the inverse-tapered section 4h.

Next, there will be explained the micro-bubble generator as the third embodiment of the present invention.

Figure 23:
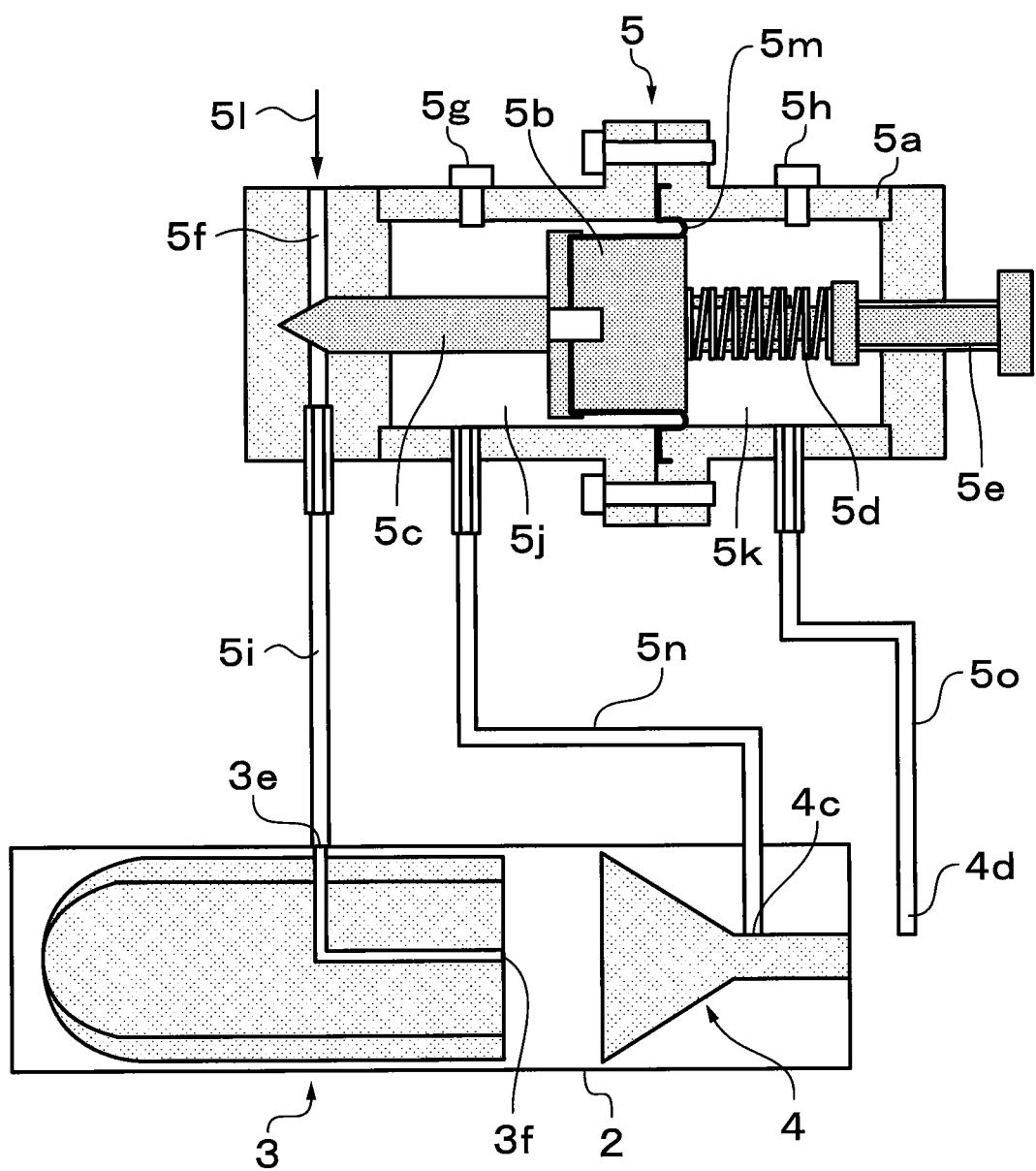
FIG. 23 is an axial-sectional view of a micro-bubble generator as a third embodiment of the present invention.

As shown in FIG. 23, the micro-bubble generator 1 is different from the micro-bubble generator 1 as the first embodiment of the present invention in the respect of the connection between the turbine vane type nozzle 3 and vortex breakdown nozzle 4 and the gas feeding unit 5. More specifically, the micro-bubble generator 1 is characterized in that the gas feeding is automated by connecting the breather 5f of the gas feeding unit 5 and gas inlet 3e of the turbine vane type nozzle 3 to each other, high-pressure section 5j of the gas feeding unit 5 and pressure sensor 4c at the inlet of the vortex breakdown section 4b of the vortex breakdown nozzle 4 to each other, and the low-pressure section 5k of the gas feeding unit 5 and pressure sensor 4d provided outside the vortex breakdown nozzle 4 to each other. Thus, the pressure sensor 4c detects the pressure of the gas column 6b passing through the vortex breakdown nozzle 4, and the pressure sensor 4d detects the pressure of the micro bubbles 6d at the outside of the pipe 2.

Note here that the connection, by means of the gas supply tube 5i, between one end of the breather 5f of the gas feeding unit 5 and gas inlet 3e of the turbine vane type nozzle 3 is similar to that in the first embodiment of the present invention. When the other end is opened, the breather 5f is supplied with the gas 5l. In case any special gas is to be used, a bomb containing the gas or the like is to be connected to the other end of the breather 5f.

The third embodiment of the present invention is similar in advantage to the first example of the first embodiment.

Next, there will be explained the micro-bubble generator as the fourth embodiment of the present invention.

Figure 24:
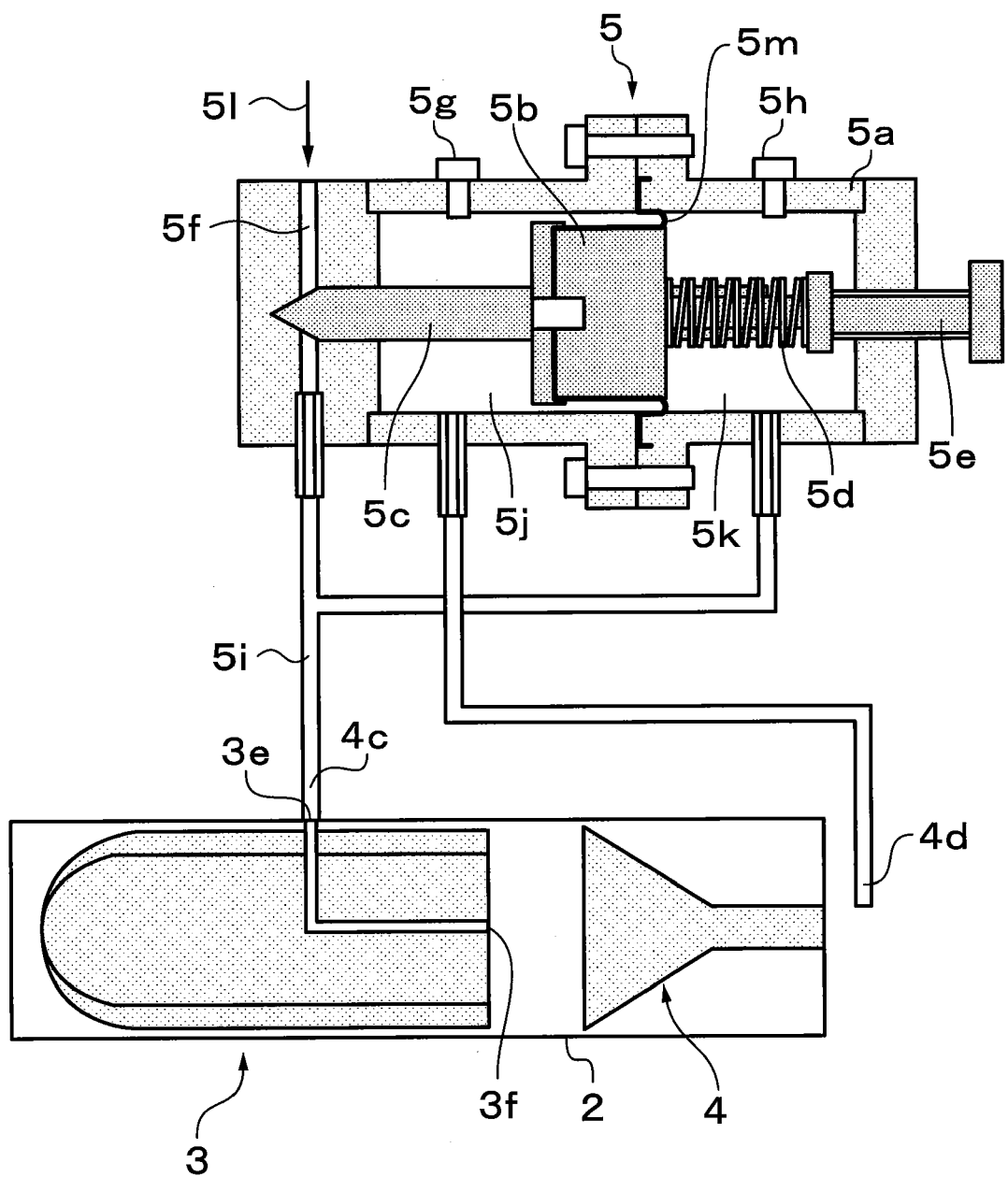
FIG. 24 is an axial-sectional view of a micro-bubble generator as a fourth embodiment of the present invention.

As shown in FIG. 24, the micro-bubble generator 1 is different from the micro-bubble generator 1 as the first example of the first embodiment in the respect of the connection between the turbine vane type nozzle 3 and vortex breakdown nozzle 4 and the gas feeding unit 5. More specifically, the micro-bubble generator 1 is characterized in that the gas feeding is automated by connecting the high-pressure section 5j of the gas feeding unit 5 to the pressure sensor 4d open to the hydrostatic pressure around the outlet of the vortex breakdown nozzle 4 and the low-pressure section 5k of the gas feeding unit 5 to the pressure sensor 4c provided at the gas inlet 3e of the turbine vane type nozzle 3. The pressure sensor 4c detects the pressure of the gas column 6b developed in the turbine vane type nozzle 3, and the pressure sensor 4d detects the pressure of the micro bubbles 6d at the outside of the pipe 2. Thus, in this micro-bubble generator 1, the gas feeding unit 5 and turbine vane type nozzle 3 can easily be connected to each other without having to provide any pressure sensor at the vortex breakdown nozzle 4.

It is when there is a large difference found between the pressure, detected by the pressure sensor 4c, of the internal gas column 6b and the external pressure of the micro bubbles 6d, detected by the pressure sensor 4d, that the micro bubbles 6d are efficiently being produced. If the pressure difference is small, the gas is being fed at an excessive rate and less micro bubbles 6d are being produced.

When there is a large difference between the pressure of the gas column 6b in the turbine vane type nozzle 3 and that of the micro bubbles 6d outside the vortex breakdown nozzle 4, the piston 5b of the gas feeding unit 5 is moved rightward to open the breather 5f for feeding the gas 5l to the gas inlet 3e.

On the contrary, when there is a small difference between the pressure of the gas column 6b in the turbine vane type nozzle 3 and that of the micro bubbles 6d outside the vortex breakdown nozzle 4, the piston 5b of the gas feeding unit 5 is moved leftward to close the breather 5f to limit the rate at which the gas 5l is fed to the gas inlet 3e.

The fourth embodiment of the present invention is similarly advantageous to the first embodiment of the present invention.

Next, there will be explained the micro-bubble generator as the fifth embodiment of the present invention.

Figure 25:
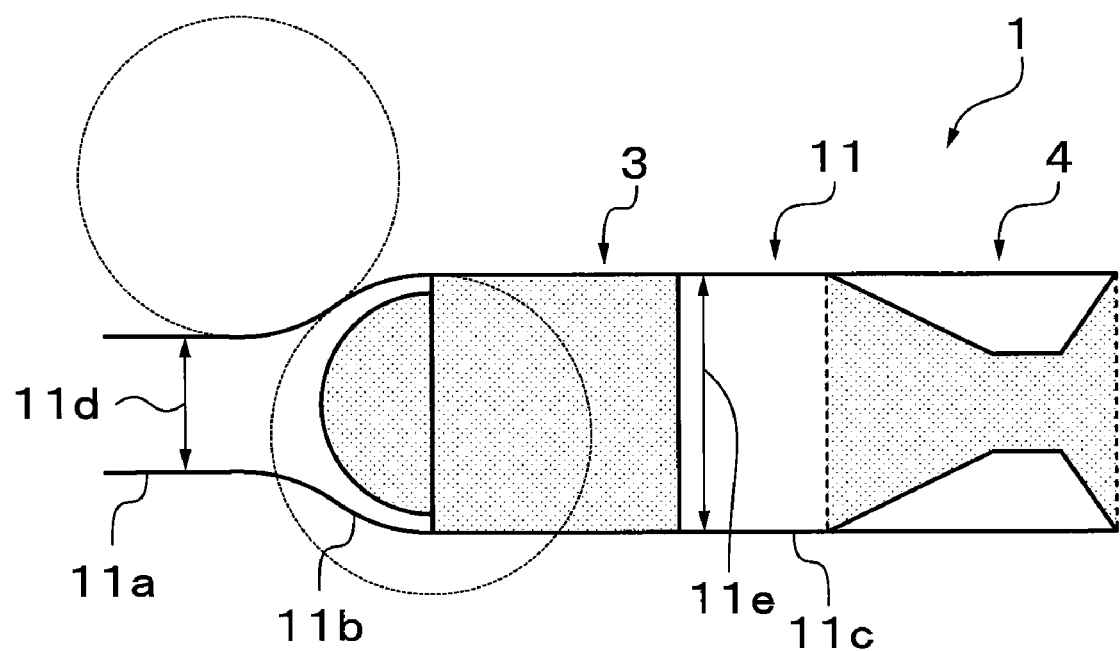
FIG. 25 is an axial-sectional view of a micro-bubble generator as a fifth embodiment of the present invention.

As shown in FIG. 25, the micro-bubble generator 1 is different from the micro-bubble generator 1 as the first embodiment of the present invention in that the pipe 2 is replaced by a diffuser 11 with the inside diameter 2d of the inlet 2a being reduced. The diffuser 11 has a tubular section 11a having a small inside diameter 11d at the inlet 2a of the pipe 2 and a large-diameter tubular section 11c having a large inside diameter 11e and including the turbine vane type nozzle 3 and vortex breakdown nozzle 4.

Of the enlarged section 11b extending from the small-diameter tubular section 11a to the large-diameter tubular sections 11c, the inside diameter smoothly increases circularly along parts of two dotted-line circles as shown in FIG. 25, and the rear portion is formed like the hemispheric portion 3c of the turbine vane type nozzle 3. Owing to the smooth spreading of the enlarged section 11b, the liquid 6 flowing through the diffuser 11 will not have the sectional area thereof increased suddenly, so that the liquid flow 6a can have the flowing direction thereof effectively changed from the axial direction of the diffuser 11 toward the circumferential direction.

In this micro-bubble generator 1, the linear liquid flow 6a supplied from a liquid feed pump such as a water pump to the inlet 2a of the diffuser 11 is effectively changed into the spiral swirling flow 6c with less influence of the flow constricted by the turbine vane type nozzle 3. Thus, the flow energy will be less lost.

The fifth example of the first embodiment has similar advantages to those of the first example of the first embodiment and a further advantage that it can produce the micro bubbles 6d with an improved efficiency.

Next, there will be explained the micro-bubble generator as the sixth embodiment of the present invention.

Figure 26:
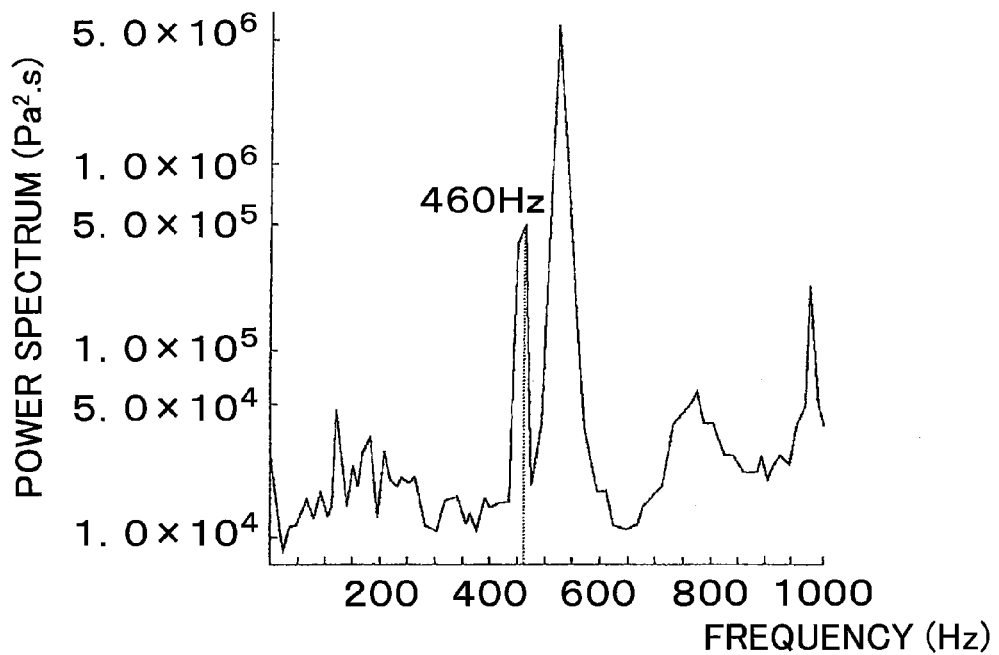
FIG. 26 schematically illustrates an acoustic-wave spectrum measured for confirming generation of micro bubbles in a micro-bubble generator as a sixth embodiment of the present invention.
Figure 27:
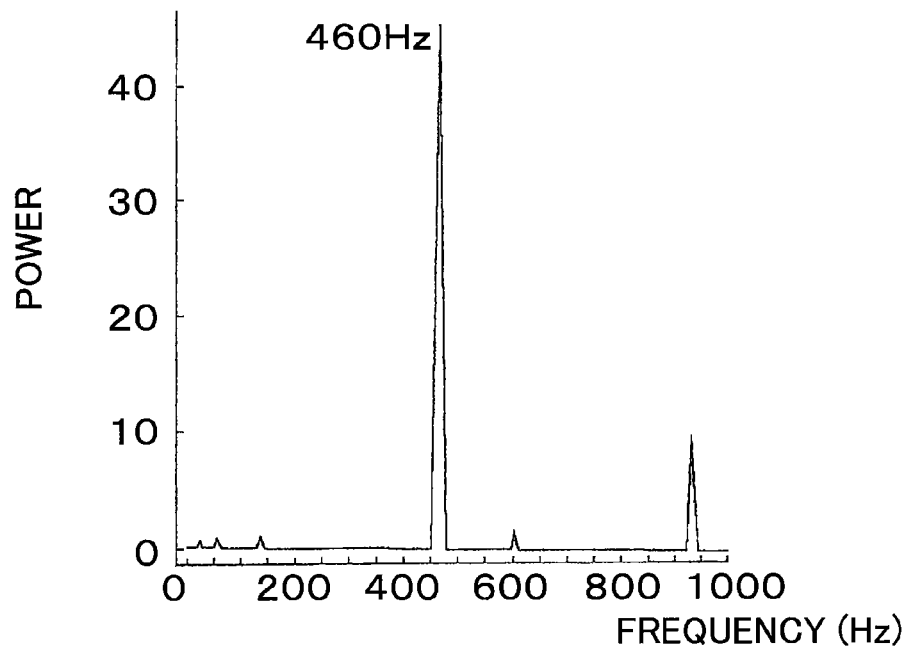
FIG. 27 schematically illustrates an image spectrum measured for confirming the generation of micro bubbles in the micro-bubble generator as the sixth embodiment of the present invention.

FIGS. 26 and 27 show an acoustic-wave spectrum and image spectrum, respectively, measured for confirming that the micro bubbles 6d are generated in the micro-bubble generator 1 as the sixth example of the first embodiment. As will be seen from this drawing, it is possible to predict a rotational frequency of the swirling flow 6c by measuring a vortex whistle caused when vortex breakdown takes place.

The acoustic-wave spectrum shown in FIG. 26 graphically plots a frequency of the vortex whistle of the swirling flow 6c, measured by a hydrophone capable of detecting sound propagated in a liquid, and the image spectrum shown in FIG. 27 graphically plots a rotational frequency of the swirling flow 6c, measured by a high-speed video camera. It should be noted however that the diameter 3j of the turbine vane type nozzle 3 is 4 cm, the inside diameter 4f of the vortex breakdown section 4b of the vortex breakdown nozzle 4 is 1 cm and the feed rate of the water used as the liquid 6 is 700 cc/s.

As shown in FIGS. 26 and 27, both the frequency in the acoustic-wave spectrum and that in the image spectrum are featured by the value of a power spectrum at about 460 Hz. Also, in the acoustic-wave spectrum shown in FIG. 26, a peak appearing nearly at 520 Hz to the right hand of the plotted frequency of about 460 Hz shows the generation of the micro bubbles 6d. It should be noted that the "power spectrum" is a representation of a root mean square of a frequency as a frequency-component distribution.

In the sixth example of the first embodiment, whether the micro bubbles 6d are being generated efficiently can be confirmed by measuring an underwater sound without having to observe directly any image of the micro bubbles 6d. Thus, the rate at which the gas 5l is fed to the gas inlet 3e can be adjusted only by measuring the acoustic wave, not by detecting the pressures in the vortex breakdown nozzle 4 as in the first to fifth examples of the first embodiment. Also, it is possible to easily confirm the generation of the micro bubbles 6d.

Next, there will be explained the micro-bubble generator as the seventh embodiment of the present invention.

This micro-bubble generator 1 is featured by a smooth outlet edge 4k of the vortex breakdown nozzle 4.

Figure 28A:
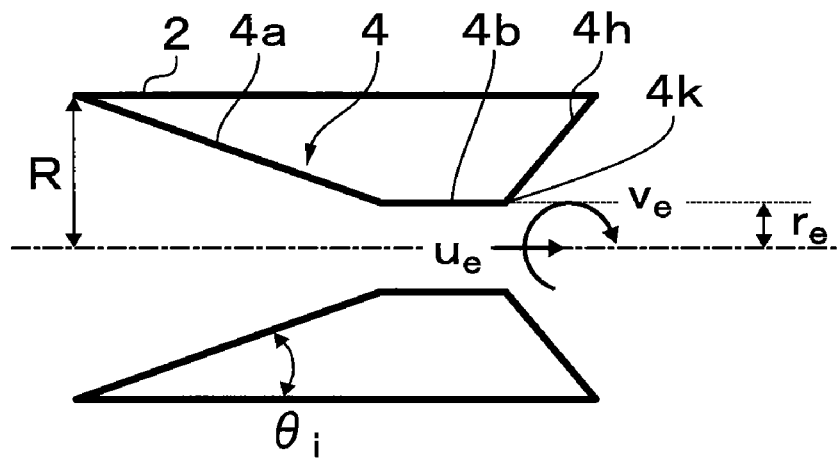
FIG. 28A is an axial-sectional view of a vortex breakdown nozzle used in a micro-bubble generator as a seventh embodiment of the present invention.
Figure 28B:
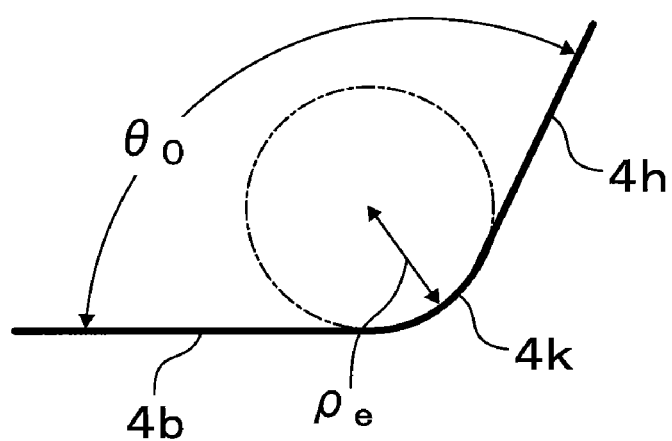
FIG. 28B is a view, enlarged in scale, of the edge of an outlet of the vortex breakdown nozzle in FIG. 28A.

FIGS. 28A and 28B show, in an enlarged scale, the vortex breakdown nozzle 4 and outlet edge 4k of the vortex breakdown nozzle 4, respectively.

Because of the smooth outlet edge 4k of the vortex breakdown nozzle 4, the gas column 6b will adhere to the front face of the vortex breakdown nozzle 4 (under the Coanda effect) and be broken down due to the shearing by the swirling flow 6c to generate the micro bubbles 6d. Also, the micro bubbles 6d are dispersed widely on the front face of the vortex breakdown nozzle 4. For adhesion of the gas column 6b to the front face of the vortex breakdown nozzle 4, the centrifugal force due to the swirling flow 6c should be larger than a centrifugal force in the main-flow direction. To this end, the radius of curvature $\rho_e$ of the edge 4k should be larger than below:

$$\rho_e \sim (u_e/v_e)^2 r_e = \Gamma_e^{-2} r_e \quad (14)$$

where $v_e$ is the circumferential velocity of the swirling flow 6c at the outlet of the vortex breakdown nozzle 4. That is, the radius of curvature should be as follows:

$$\rho_e \geq \Gamma_e^{-2} r_e \quad (15)$$

The direction in which the micro bubbles 6d are blown out of the outlet of the vortex breakdown nozzle 4 depends upon an angle $\theta_0$ defined between the tubular vortex breakdown section 4b and inverse-tapered section 4h of the vortex breakdown nozzle 4.

Figure 29:
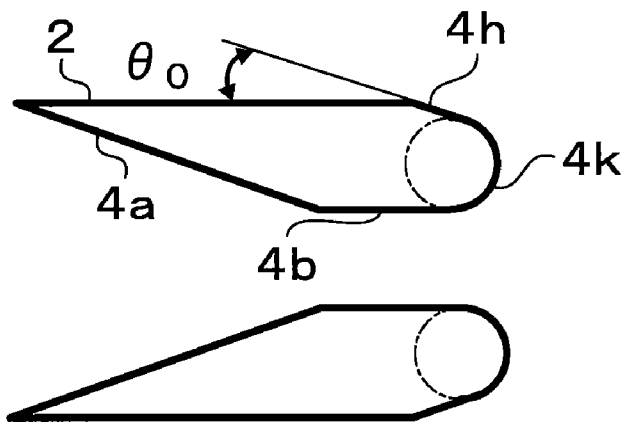
FIG. 29 schematically illustrates supercritical vortex breakdown taking place in the vortex breakdown nozzle of the micro-bubble generator as the seventh embodiment of the present invention.
Figure 30:
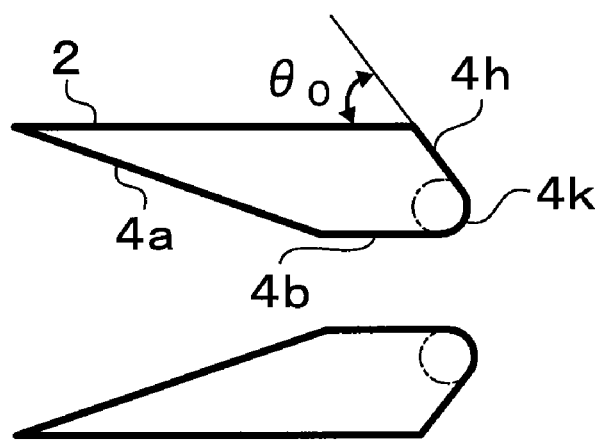
FIG. 30 schematically illustrates subcritical vortex breakdown taking place in the vortex breakdown nozzle of the micro-bubble generator as the seventh embodiment of the present invention.

FIG. 29 shows supercritical vortex breakdown in which the number of times of circulation $\Gamma_e$ is almost equal to the critical number of times of circulation $\Gamma_{cr}$ and FIG. 30 shows subcritical vortex breakdown in which $\Gamma_e > \Gamma_{cr}$.

FIGS. 31A, 31B and 31C shows showing shapes of the vortex breakdown nozzles 4 in which the angle $\theta_0$ is about 80 deg., 90 deg. and 130 deg., respectively. In all these examples, the curvature of the outlet edge 4k of the vortex breakdown nozzle 4 permits the swirling flow 6c to adhere to the front face of the vortex breakdown nozzle 4 and go tangentially of the front face.

The seventh embodiment of the present invention has advantages similar to those of the first embodiment of the present invention.

In the foregoing, the present invention has been described in detail concerning certain preferred embodiments and examples thereof with reference to the accompanying drawings. However, it should be understood by those ordinarily skilled in the art that the present invention is not limited to the embodiments and examples but can be modified in various manners, constructed alternatively or embodied in various other forms without departing from the scope and spirit thereof as set forth and defined in the appended claims.

For example, the numerical values, structures, disposition of elements, etc. in the embodiments and examples having been described in the foregoing are just examples and may be altered as necessary.

Also, two or more of the first to seventh embodiment of the present invention may be combined together as necessary.

What is claimed is:

1. A micro-bubble generator comprising at least a vortex breakdown nozzle including a flow constricting section and vortex breakdown section, wherein a swirling flow of liquid having a gas introduced to the center thereof is supplied to the flow constricting section to provide micro bubbles from the vortex breakdown section, further comprising a swirling-flow generating vane type nozzle connected coaxially to the vortex breakdown nozzle, the swirling-flow generating vane type nozzle being formed from a vane swirler enclosed in a cylindrical pipe, the vane swirler including a cylindrical body of which one end portion is formed streamlined, a plurality of vanes being provided on the outer circumferential surface of the cylindrical body longitudinally of the latter and having the rear portions thereof curved, a jet orifice of a gas being formed in the other end portion of the cylindrical body, and the swirling flow being formed by supplying the liquid to the inlet of the swirling-flow generating vane type nozzle.

2. The micro-bubble generator according to claim 1, wherein the flow constricting section is gradually decreased in sectional area toward the vortex breakdown section to be equal in sectional shape to the vortex breakdown section at the boundary between these sections.

3. The micro-bubble generator according to claim 1, wherein the vortex breakdown section is cylindrical.

4. The micro-bubble generator according to claim 1, wherein the vortex breakdown section is gradually increased in sectional area toward the outlet of the vortex breakdown nozzle.

5. The micro-bubble generator according to claim 1, wherein the vortex breakdown section includes a first portion which is cylindrical and a second portion which is wider toward the outlet; and
an angle $\theta_0$ formed between the inner circumferential surface of the first portion and end surface of the second portions is 0 deg.$<\theta_0<$180 deg.

6. The micro-bubble generator according to claim 5, wherein the inner circumferential surface of the first portion and end face of the second portion are joined smoothly to each other.

7. The micro-bubble generator according to claim 1, wherein the vane swirler has a gas inlet formed in the outer circumferential surface of the cylindrical body and the jet orifice formed at the other end portion of the cylindrical body; and
the gas inlet and jet orifice communicate with each other via a channel formed in the cylindrical body.

8. The micro-bubble generator according to claim 7, further comprising a gas feeding unit that adjusts the rate at which a gas is fed to the gas inlet of the vane swirler.

9. The micro-bubble generator according to claim 8, wherein the gas feeding unit has an breather of which the sectional area can be controlled, and adjusts the rate at which the gas is fed to the gas inlet of the vane swirler by controlling the sectional area of the breather.

10. The micro-bubble generator according to claim 9, wherein the breather of the gas feeding unit and gas inlet of the vane swirler are connected to each other by a gas supply tube.

11. The micro-bubble generator according to claim 9, wherein the sectional area of the breather is controlled based on a pressure detected in the vortex breakdown section.

12. The micro-bubble generator according to claim 7, wherein the rate at which the gas is fed to the gas inlet of the vane swirler is adjusted correspondingly to a result of detection of sound caused in the vortex breakdown section.

13. The micro-bubble generator according to claim 1, wherein the pipe includes a first section and a second section thicker than the first section and in which the vane swirler is accommodated.

14. A swirling-flow generating vane type nozzle for use in a micro-bubble generator, the swirling-flow generating vane type nozzle comprising a vane swirler enclosed in a cylindrical pipe,
the vane swirler including a cylindrical body of which one end portion is formed streamlined,
a plurality of vanes being provided on the outer circumferential surface of the cylindrical body longitudinally of the latter and having the rear portions thereof curved, and
a jet orifice of a gas being formed in the other end portion of the cylindrical body.

15. A vane swirler for use in a micro-bubble generator, the vane swirler comprising a cylindrical body of which one end portion is formed streamlined,
a plurality of vanes being provided on the outer circumferential surface of the cylindrical body longitudinally of the latter and having the rear portions thereof curved, and
a jet orifice of a gas being formed in the other end portion of the cylindrical body.

16. A micro-bubble generating method in which at least a vortex breakdown nozzle including a flow constricting section and a vortex breakdown section is used to provide micro bubbles from the vortex breakdown section by supplying a swirling flow of liquid having a gas introduced to the center thereof to the flow constricting section,
further using a swirling-flow generating vane type nozzle connected coaxially to the vortex breakdown nozzle,
the swirling-flow generating vane type nozzle being formed from a vane swirler enclosed in a cylindrical pipe,
the vane swirler including a cylindrical body of which one end portion is formed streamlined,
a plurality of vanes being provided on the outer circumferential surface of the cylindrical body longitudinally of the latter and having the rear portions thereof curved,
a jet orifice of a gas being formed in the other end portion of the cylindrical body, and
the swirling flow being formed by supplying the liquid to the inlet of the swirling-flow generating vane type nozzle.

17. A micro-bubble applying device comprising at least a micro-bubble generator,
at least one micro-bubble generator being a micro-bubble generator comprising at least a vortex breakdown nozzle comprising a flow constricting section and a vortex breakdown section, a swirling flow of liquid having a gas introduced to the center thereof being supplied to the flow constricting section to provide micro-bubbles from the vortex breakdown section,
the micro-bubble generator further comprising a swirling-flow generating vane type nozzle connected coaxially to the vortex breakdown nozzle,
the swirling-flow generating vane type nozzle being formed from a vane swirler enclosed in cylindrical pipe,
the vane swirler including a cylindrical body of which one end portion is formed streamlined,
a plurality of vanes being provided on the outer circumferential surface of the cylindrical body longitudinally of the latter and having the rear portions thereof curved,
a jet orifice of a gas being formed in the other end portion of the cylindrical body, and
the swirling flow being formed by supplying the liquid to the inlet of the swirling-flow generating vane type nozzle.

* * * * *